United States Patent
Isobe et al.

(10) Patent No.: US 10,802,040 B2
(45) Date of Patent: Oct. 13, 2020

(54) ACCELERATION SENSOR

(71) Applicant: HITACHI, LTD., Tokyo (JP)

(72) Inventors: Atsushi Isobe, Tokyo (JP); Takashi Shiota, Tokyo (JP); Yuudai Kamada, Tokyo (JP); Chisaki Takubo, Tokyo (JP); Noriyuki Sakuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 204 days.

(21) Appl. No.: 16/064,562

(22) PCT Filed: Apr. 18, 2016

(86) PCT No.: PCT/JP2016/062264
§ 371 (c)(1),
(2) Date: Jun. 21, 2018

(87) PCT Pub. No.: WO2017/183082
PCT Pub. Date: Oct. 26, 2017

(65) Prior Publication Data
US 2018/0372774 A1 Dec. 27, 2018

(51) Int. Cl.
*G01P 15/125* (2006.01)
*G01P 15/08* (2006.01)

(52) U.S. Cl.
CPC ............ *G01P 15/125* (2013.01); *G01P 15/08* (2013.01); *G01P 15/0802* (2013.01); *G01P 2015/0831* (2013.01)

(58) Field of Classification Search
CPC ..... G01P 15/125; G01P 15/08; G01P 15/0802
(Continued)

(56) References Cited

U.S. PATENT DOCUMENTS 8,122,767 B2   2/2012 Dwyer et al.
9,970,956 B2   5/2018 Zhang et al.
(Continued)

FOREIGN PATENT DOCUMENTS

JP   2009-537803 A   10/2009
JP   2010-133935 A   6/2010
(Continued)

OTHER PUBLICATIONS

International Search Report of PCT/JP2016/062264 dated Jul. 12, 2016.

*Primary Examiner* — Tarun Sinha
(74) *Attorney, Agent, or Firm* — Mattingly & Malur, PC

(57) ABSTRACT

An acceleration sensor has high sensitivity, low power consumption and high linearity of output to the applied acceleration under gravity. To solve the above problem, the acceleration sensor is provided with a movable section placed between a base substrate and a cap substrate and rotating about a rotation axis. A top left electrode included in the cap substrate and a left movable electrode included in the movable section form a left capacitor, and a top right electrode included in the cap substrate and a right movable electrode included in the movable section form a right capacitor. Then, a lateral width of a first detection region in which capacitance is detected between the top left electrode and the left movable electrode, and a lateral width of a second detection region in which capacitance is detected between the top right electrode and the right movable electrode are different from each other.

12 Claims, 18 Drawing Sheets

(58) Field of Classification Search
USPC .................................................. 73/514.32
See application file for complete search history.

(56) References Cited

U.S. PATENT DOCUMENTS

| | | |
|---|---|---|
| 2011/0023604 A1 | 2/2011 | Cazzaniga et al. |
| 2011/0192229 A1 | 8/2011 | Chen et al. |
| 2013/0264661 A1 | 10/2013 | Tanaka |
| 2014/0069190 A1* | 3/2014 | Tanaka .................. G01P 15/125 |
| | | 73/514.32 |
| 2014/0283605 A1* | 9/2014 | Baldasarre ............ G01P 15/125 |
| | | 73/514.32 |

FOREIGN PATENT DOCUMENTS

| | | |
|---|---|---|
| JP | 2012-141160 A | 7/2012 |
| JP | 2013-519880 A | 5/2013 |
| JP | 2013-217772 A | 10/2013 |
| JP | 2014-016175 A | 1/2014 |

* cited by examiner

ACCELERATION SENSOR

TECHNICAL FIELD

This invention relates to an acceleration sensor.

BACKGROUND ART

In the field of mining resources exploration, an acceleration sensor is used to conduct seismic reflection exploration. The seismic reflection exploration is a type of geophysical exploration, which is a method for revealing the subsurface structure that involves artificially generating seismic waves, then using a geophone mounted on the ground surface to capture the reflected waves bouncing back from the subsurface, and then analyzing the results.

In the seismic reflection exploration, a vibrator source is placed on the ground surface to excite elastic waves in the subsurface and a geophone is placed on the ground surface to sense the elastic waves reflected off a layer boundary. The elastic waves, which have been excited in various directions, propagate through the subsurface with high attenuation, are reflected off a plurality of strata, propagate again through the subsurface with high attenuation, and return to the ground surface while spreading into a wide area.

Therefore, an acceleration sensor used in the seismic reflection exploration is required to sense an acceleration which is applied in the vertical direction, that is, in the same direction as that of the gravitational acceleration and which is lower than the gravitational acceleration. That is, an accelerator sensor used in the seismic reflection exploration is required to have enhanced sensitivity to acceleration in the vertical direction.

Background Art of the art includes Japanese Unexamined Patent Application Publication No. 2014-16175 (Patent Literature 1) and Japanese Unexamined Patent Application Publication No. 2010-133935 (Patent Literature 2).

Japanese Unexamined Patent Application Publication No. 2014-16175 (Patent Literature 1) discloses an inertial sensor that includes a movable portion rotating about a rotation axis, the movable portion including a first region and a second region, the length from the rotation axis to an end of the first region being different from the length from the rotation axis to an end of the second region.

Also, Japanese Unexamined Patent Application Publication No. 2010-133935 (Patent Literature 2) discloses a MEMS accelerometer that has a housing, a proof mass suspended within the housing by torsional flexure, and a magnet and a planar coil on the proof mass as a torsional magnetic rebalancing component.

CITATION LIST

Patent Literature

Patent Literature 1: Japanese Unexamined Patent Application Publication No. 2014-16175
Patent Literature 2: Japanese Unexamined Patent Application Publication No. 2010-166935

SUMMARY OF INVENTION

Technical Problem

In the acceleration sensor used in the seismic reflection exploration, the enhancement in sensitivity to acceleration may be sometimes achieved by increasing the mass of a movable portion or reducing the spring constant of an elastically deformable portion through which a movable portion is connected to a stationary portion.

However, the movable portion connected to the stationary portion is inclined by its own weight. And, if an acceleration lower than a gravitational acceleration applied in the vertical direction is detected while the movable portion is inclined by its own weight, this causes an increase in power consumption of the acceleration sensor or degradation in linearity of the output of the acceleration sensor to the applied acceleration.

Accordingly, the present invention provides an acceleration sensor with high sensitivity, low power consumption and high linearity of output to the applied acceleration under gravity.

Solution to Problem

To solve the above problem, an acceleration sensor according to the present invention includes: a first substrate; a second substrate located away from the first substrate in a first direction; and a movable section placed between the first substrate and the second substrate and rotating about a rotation axis along a second direction which is at right angles to the first direction. The movable section includes a first movable electrode and a second movable electrode which are placed on both sides of the rotation axis in a third direction which is at right angles to the first direction and the second direction. The second substrate includes a first detection electrode facing the first movable electrode, and a second detection electrode facing the second movable electrode. Further, a first detection region in which capacitance is detected between the first movable electrode and the first detection electrode has a width in the third direction, and a second detection region in which capacitance is detected between the second movable electrode and the second detection electrode has a different width in the third direction from the width of the first detection region.

Advantageous Effects of Invention

According to the present invention, an acceleration sensor with high sensitivity, low power consumption and high linearity of output to the applied acceleration under gravity can be provided. Further, an acceleration sensor with a low servo voltage can be provided.

The above-recited and other problems, configurations and advantageous effects will be apparent from the following description of embodiments.

DESCRIPTION OF EMBODIMENTS

In the following embodiments, for the sake of convenience, a description may be divided into a plurality of sections or embodiments as necessary, and, unless otherwise specified, they will not be unconnected with each other. Rather, one of them will be connected with a modification, details, supplemental remarks and/or the like of part or whole of another of them.

Further, the number of elements (including piece count, numeric values, amount/quantity, range and the like) and/or the like refereed in the following embodiments is not limited to a specific number unless otherwise specified, unless explicitly limited to a specific number in principle, and the like, and the number may be any number greater or less than the specific number.

Further, it should be understood that, in the following embodiments, the other components (including element steps and the like) are not necessarily essential unless otherwise specified, unless determined to be explicitly essential in principle, and the like.

Similarly, a shape, a positional relationship and/or the like of a component and/or the like refereed in the following embodiments include any shape and/or the like such as being analogous or similar to the shape and/or the like in effect unless otherwise specified, unless determined to be explicitly the case in principle, and the like. The same holds true for the numerical values and range described above.

Embodiments according to the present invention will now be described in detail with reference to the accompanying drawings. It should be noted that like reference signs are used throughout the figures used for description of the embodiments, to designate members having the same/similar functions, and a repetitive description is omitted. Further, in the following embodiments, a description of the same/similar element or configuration is not repeated in principle except when necessary.

First Embodiment

<Seismic Reflection Exploration Method>

Initially, seismic reflection exploration using an acceleration sensor and conducted in the field of mining resources exploration is described. The seismic reflection exploration is a type of geophysical exploration, which is a method for revealing the subsurface structure that involves artificially generating seismic waves, then using a geophone mounted on the ground surface to capture the reflected waves bouncing back from the subsurface, and then analyzing the results.

Figure 1:
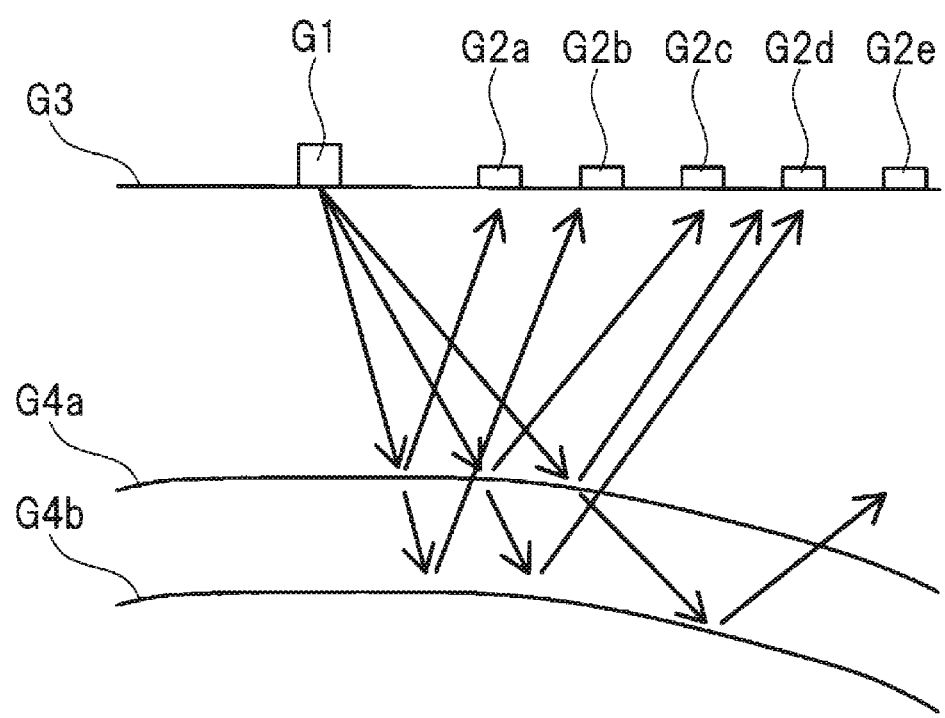
FIG. 1 is a schematic sectional view of the ground surface, illustrating the overview of seismic reflection exploration.

FIG. 1 is a schematic sectional view of the ground surface, illustrating the overview of seismic reflection exploration.

As illustrated in FIG. 1, in the seismic reflection exploration, elastic waves (indicated with arrows in FIG. 1) are excited in the subsurface by a vibrator source G1 placed on a ground surface G3, and then the elastic waves, which have been reflected off any of layer boundaries G4a, G4b, are sensed by any of geophones G2a, G2b, G2c, G2d, G2e which are placed on the ground surface G3.

Since a typical vibration source G1 generates vibration in a direction perpendicular to the ground surface G3, P-waves are effectively excited in a nearly vertical direction. Because of this, the seismic reflection exploration uses P-waves. Also, the elastic waves returning to the ground surface G3 are P-waves propagating in a nearly vertical direction. Therefore, there is a need for the geophone G2a, G2b, G2c, G2d, G2e to sense elastic vibration in the vertical direction.

The elastic waves, which have been excited in various directions propagate in the subsurface with high attenuation, propagate through the subsurface with high attenuation, are reflected off a plurality of the layer boundaries G4a, G4b, propagate again through the subsurface with high attenuation, and return to the ground surface G3 while spreading into a wide area.

Sensing of feeble elastic vibration requires using an acceleration sensor with high sensitivity in the vertical direction as the geophone G2a, G2b, G2c, G2d, G2e. Accordingly, it is desired to use an acceleration sensor in accordance with the first embodiment described below as the geophone G2a, G2b, G2c, G2d, G2e.

<Configuration of Acceleration Sensor>

Next, the configuration of the acceleration sensor in accordance with the first embodiment will be described with reference to FIG. 2 to FIG. 6.

Figure 2:
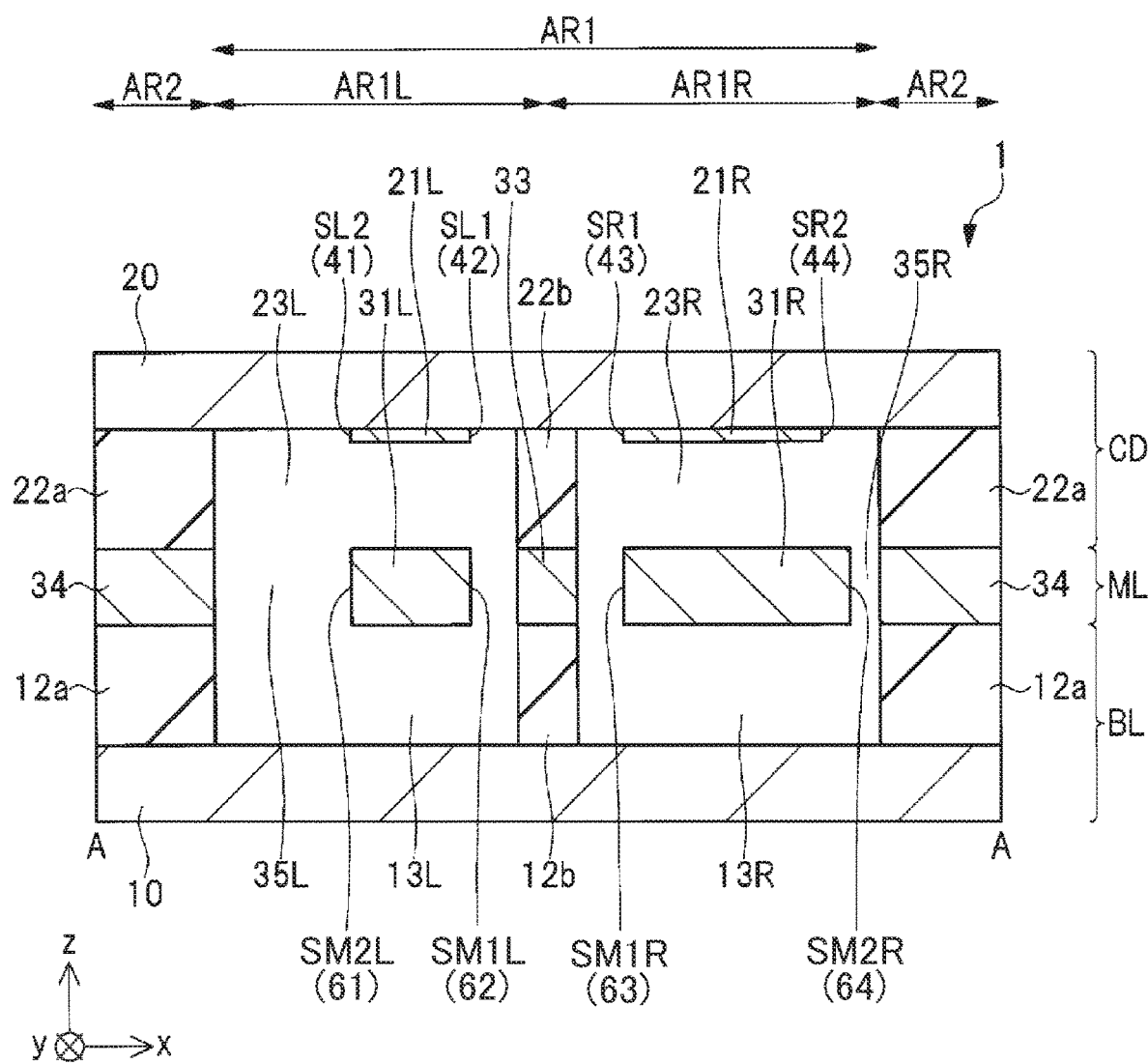
FIG. 2 is a sectional view of an acceleration sensor in accordance with a first embodiment.
Figure 3:
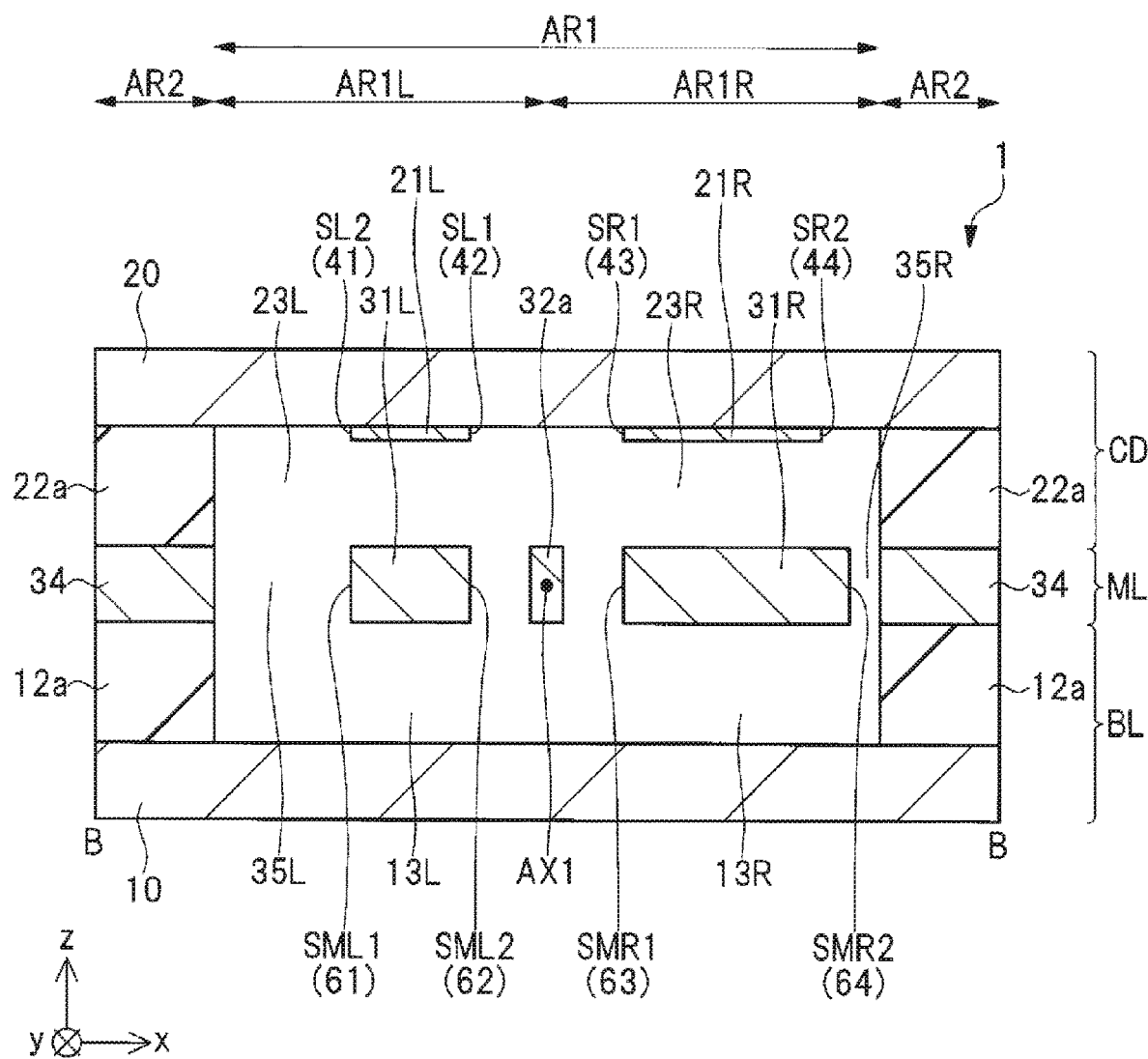
FIG. 3 is a sectional view of the acceleration sensor in accordance with the first embodiment.
Figure 4:
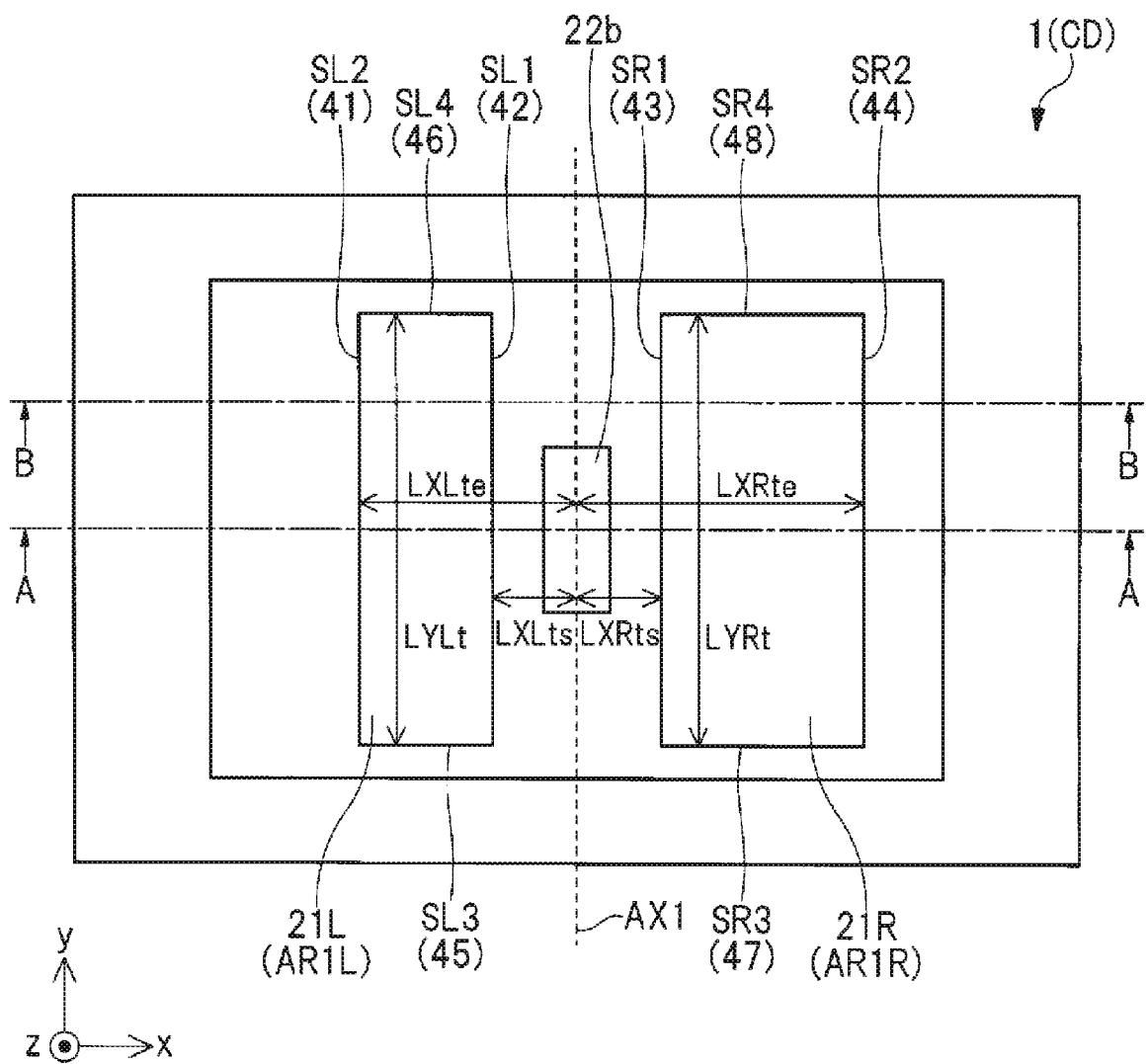
FIG. 4 is a plan view of the acceleration sensor in accordance with the first embodiment.
Figure 5:
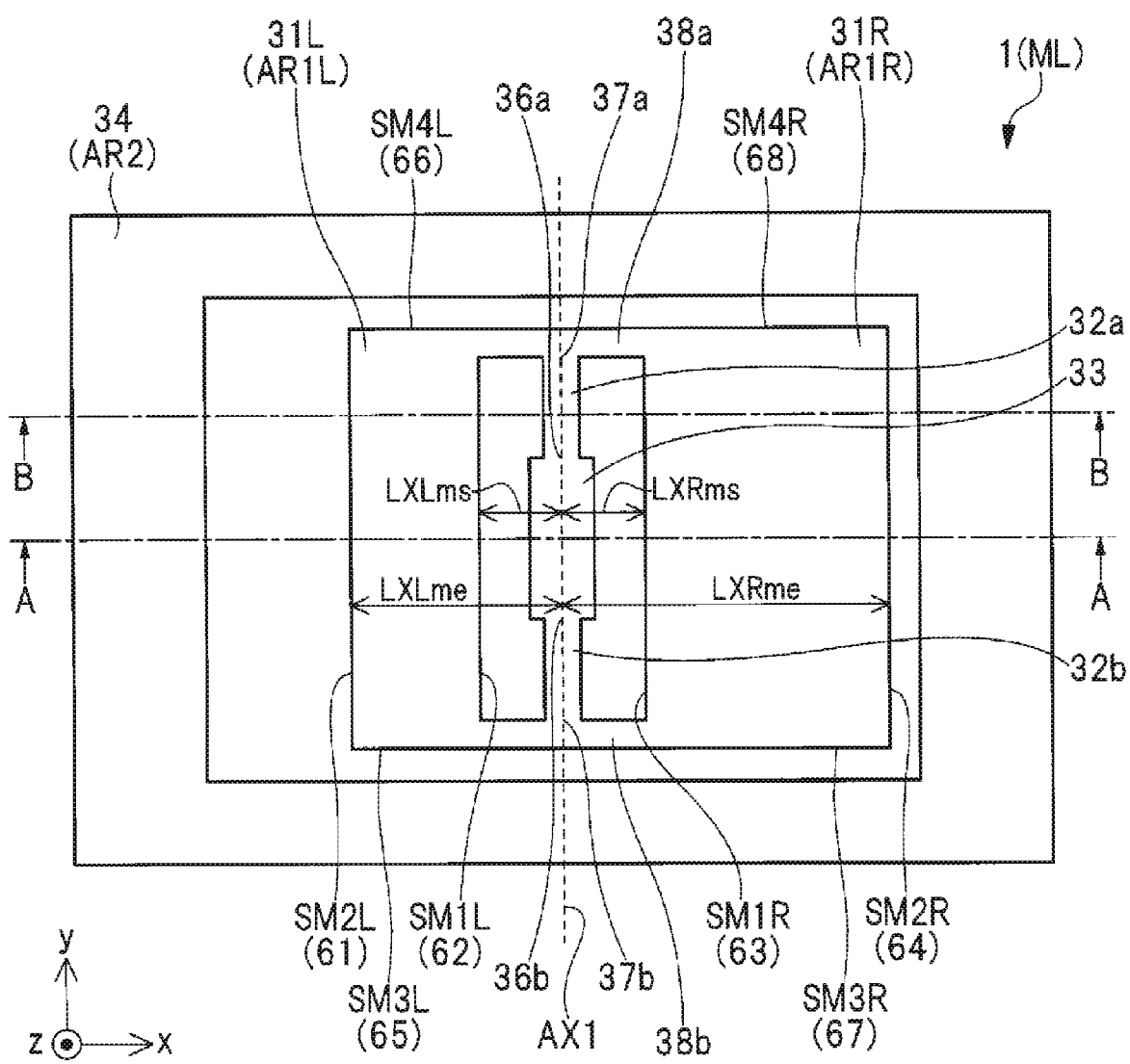
FIG. 5 is a plan view of the acceleration sensor in accordance with the first embodiment.
Figure 6:
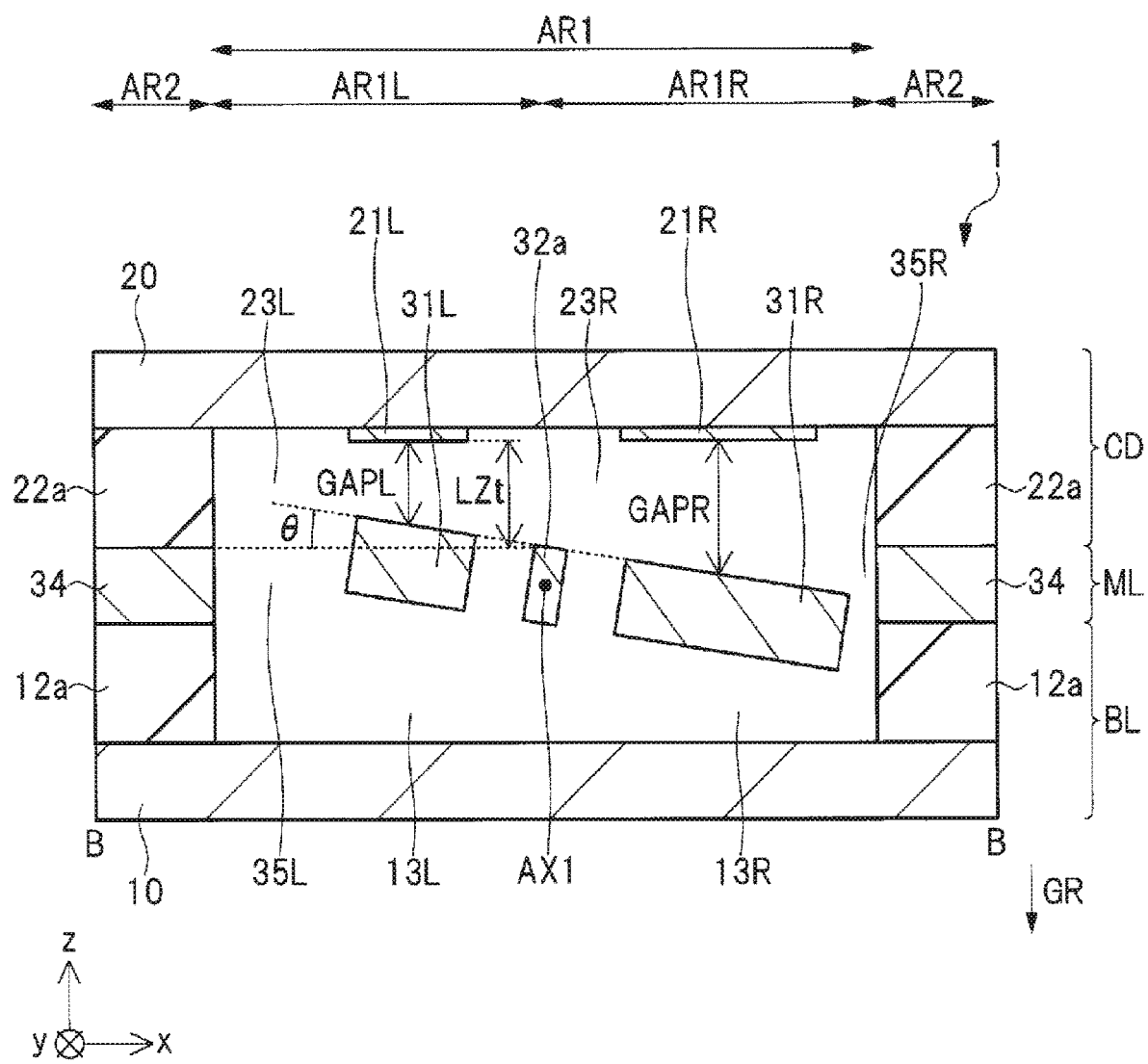
FIG. 6 is a sectional view of the acceleration sensor in accordance with the first embodiment.

FIG. 2 and FIG. 3 are sectional views of the acceleration sensor in accordance with the first embodiment. FIG. 4 and FIG. 5 are plan views of the acceleration sensor in accordance with the first embodiment. FIG. 6 is a sectional view of the acceleration sensor in accordance with the first embodiment.

FIG. 2 is the sectional view taken along line A-A of FIG. 4 and FIG. 5, and FIG. 3 and FIG. 6 are the sectional views taken along line B-B of FIG. 4 and FIG. 5. FIG. 2 and FIG. 3 illustrate the state of gravitational acceleration being not applied in a z-axis direction, and FIG. 6 illustrates the state of gravitational acceleration being applied in a negative z-axis direction. Specifically, FIG. 6 illustrates the state of a left movable electrode and a right movable electrode being rotationally displaced about a rotation axis by the gravitational acceleration.

FIG. 4 illustrates a state of the underside of a cap layer. FIG. 5 illustrates the state of removing the cap layer and being transparently viewed from a positive z direction, or the state of a membrane layer.

As illustrated in FIGS. 2 and 3, the acceleration sensor 1 in accordance with the first embodiment has a base layer BL, a membrane layer ML and a cap layer CD.

As illustrated in FIGS. 2, 3, and 4, the base layer BL has a base substrate 10 as a base substance, gap adjustment films 12a, 12b, a left space 13L, and a right space 13R.

The base substrate 10 has: a region AR1 which is a region of the upper side as a main surface of the base substrate 10, serving as a central region around the center of the base substrate 10; and a region AR2 which is the region of the upper side, serving as a peripheral region located closer to the periphery of the base substrate 10 than the region AR1 is located.

It is noted that, in plan view, two intersecting directions, preferably, two directions intersecting at right angles, are assumed as an x-axis direction and a y-axis direction, and a direction perpendicular to the main surface of the base substrate 10 is assumed as a z-axis direction. Further, the term "in plan view" means when viewed from the z-axis direction which is the direction perpendicular to the upper side as the main surface of the base substrate 10.

In the region AR2, the gap adjustment film 12a is formed on the upper side of the base substrate 10, or, on the base substrate 10. In part of the region AR1, the gap adjustment film 12b is also formed on the upper side of the base substrate 10, or, on the base substrate 10 to be located at the same level as the gap adjustment film 12a.

On the other hand, in the region AR1 other than the region in which the gap adjustment film 12b is formed, any gap adjustment film 12b is not formed on the upper side of the base substrate 10, or, on the base substrate 10.

Because of the placement of the gap adjustment films 12a, 12b, a left space 13L and a right space 13R are created on the base substrate 10 in the region AR1 other than the region in which the gap adjustment film 12b is formed. In other words, the gap adjustment films 12a, 12b are provided in order to create the left space 13L and the right space 13R. The left space 13L and the right space 13R are filled with a gas at a pressure well below atmospheric pressure.

The base substrate 10 is formed of a single crystalline silicon substrate.

As illustrated in FIGS. 2, 3, and 4, the cap layer CD has a cap substrate 20 as a base substance, a top left electrode 21L, a top right electrode 21R, gap adjustment films 22a, 22b, a left space 23L, and a right space 23R.

The region AR1 is divided into a region AR1L and a region AR1R. The region AR1L is a region of the underside as a main surface of the cap substrate 20, which is a region serving as a left half of a central region around the center of the cap substrate 20. The region AR1R is a region of the underside as the main surface of the cap substrate 20, which is a region serving as a right half of the central region around the center of the cap substrate 20.

Further, the region AR2 is a region of the underside of the cap substrate 20, which is a region serving as a peripheral region located closer to the periphery of the cap substrate 20 than the regions AR1L, AR1R are located.

In the region AR2, the gap adjustment film 22a is formed on the underside of the cap substrate 20, or, underneath the cap substrate 20. In part of the regions AR1L, AR1R, the gap adjustment film 22b is also formed on the underside of the cap substrate 20, or, underneath the cap substrate 20 to be located at the same level as the gap adjustment film 22a.

On the other hand, in the region AR1L other than the region in which the gap adjustment film 22b is formed, any gap adjustment film 22b is not formed on the underside of the cap substrate 20, or, underneath the cap substrate 20, and instead the top left electrode 21L is formed. The top left electrode 21L is placed in the region AR1L and, in plan view, on one side of the gap adjustment film 22b in the x-axis direction (on the left side of FIG. 4). The top left electrode 21L is placed to face the upper side of a left movable electrode 31L as a movable section.

Further, in the region AR1R other than the region in which the gap adjustment film 22b is formed, any gap adjustment film 22b is not formed on the underside of the cap substrate 20, or, underneath the cap substrate 20, and instead the top right electrode 21R is formed. The top right electrode 21R is placed in the region AR1R and, in plan view, on one side of the gap adjustment film 22b in the x-axis direction (on the right side of FIG. 4). The top right electrode 21R is placed to face the upper side of a right movable electrode 31R as a movable section.

The gap adjustment films 22a, 22b have a thickness greater than that of the top left electrode 21L. Because of this, a left space 23L is created under the top left electrode 21L and the cap substrate 20 in the left region AR1L. In other words, the gap adjustment films 22a, 22b are provided in order to create the left space 23L under the top left electrode 21L. The left space 23L is filled with a gas at a pressure well below atmospheric pressure.

Further, the gap adjustment films 22a, 22b also have a thickness greater than that of the top right electrode 21R. Because of this, a right space 23R is created under the top right electrode 21R and the cap substrate 20 in the right region AR1R. In other words, the gap adjustment films 22a, 22b are provided in order to create the right space 23R under the top right electrode 21R. The right space 23R is filled with a gas at a pressure well below atmospheric pressure.

The cap substrate 20 is formed of a single crystalline silicon substrate and a silicon oxide film formed over the surface of the single crystalline silicon substrate. The top left electrode 21L and the top right electrode 21R are electrically isolated the single crystalline silicon substrate of the cap substrate 20 by the silicon oxide film. Each of the top left electrode 21L and the top right electrode 21R is electrically connected to, for example, a detection circuit through an electrical connection line (not shown).

As illustrated in FIGS. 2, 3, and 5, the membrane layer ML has: a left movable electrode 31L as a movable section; a right movable electrode 31R as a movable section; coupling portions 38a, 38b which couple the left movable electrode 31L and the right movable electrode 31R to each other; torsion springs 32a, 32b; a stationary portion 33; and a frame 34. Each of the left movable electrode 31L, the right movable electrode 31R, the coupling portions 38a, 38b, the torsion springs 32a, 32b, the stationary portion 33 and the frame 34 is formed of a low resistivity, single crystalline silicon substrate, and formed by etching the single crystalline silicon substrate, for example, in the thickness direction (z-axis direction) by DRIE (Deep Reactive Ion Etching) in order to create a hole extending through the single crystalline silicon substrate.

It is noted that a left space 35L is created on the outward side of the left movable electrode 31L. A right space 35R is also created on the outward side of the right movable electrode 31R.

The stationary portion 33 is sandwiched between the gap adjustment film 12b and the gap adjustment film 22b as illustrated in FIG. 2. The lower end of the stationary portion 33 is mechanically connected to the gap adjustment film 12b, while the upper end of the stationary portion 33 is mechanically connected to the gap adjustment film 22b.

The gap adjustment film 12b is mechanically connected to the base substrate 10, thus the stationary portion 33 being mechanically fixed to the base substrate 10. Specifically, the stationary portion 33 is fixed on the upper side, i.e., the main surface of base substrate 10. Also, the gap adjustment film 22b is mechanically connected to the cap substrate 20, thus the stationary portion 33 being mechanically fixed to the cap substrate 20. The stationary portion 33 is electrically connected to, for example, a detection circuit through an electrical connection line (not shown).

The torsion spring 32a extends in the y-axis direction. One end 36a in the y-axis direction of the torsion spring 32a is connected to the stationary portion 33, and the other end 37a in the y-axis direction of the torsion spring 32a is connected to the coupling portion 38a. The torsion spring 32b also extends in the y-axis direction. One end 36b in the y-axis direction of the torsion spring 32b is connected to the stationary portion 33, and the other end 37b in the y-axis direction of the torsion spring 32b is connected to the coupling portion 38b.

The torsion spring 32a is configured such that elastic deformation of the torsion spring 32a causes the end 37a to be twisted relative to the end 36a, thereby making the end 37a rotationally displaceable relative to the end 36a about the same rotational axis AX1 as a rotation axis AX1 of the torsion spring 32a. The torsion spring 32b is also configured such that elastic deformation of the torsion spring 32b causes the end 37b to be twisted relative to the end 36b, thereby making the end 37b rotationally displaceable relative to the end 36b about the same rotational axis AX1 as a rotation axis AX1 of the torsion spring 32b. Thus, the torsion springs 32a, 32b are an elastic deformation portion.

The thickness of the torsion spring 32a in the z-axis direction is preferably greater than the width of the torsion spring 32a in the x-axis direction. This facilitates twisting of the end 37a relative to the end 36a. Also, the thickness of the torsion spring 32b in the z-axis direction is preferably greater than the width of the torsion spring 32b in the x-axis direction. This facilitates twisting of the end 37b relative to the end 36b.

As illustrated in FIG. 5, the left movable electrode 31L is placed on one side of the stationary portion 33 in the x-axis direction (on the left side of FIG. 5) in the region AR1L in plan view. The left movable electrode 31L has an end 62 on the rotation axis AX1 side thereof, and the two torsion springs 32a, 32b, which are rotationally displaceable about the rotation axis AX1 extending in the y-axis direction, are connected in positions separated from each other in the y-axis direction to the end 62 through the coupling portions 38a, 38b. Therefore, the end 62 on the stationary portion 33 side of the left movable electrode 31L is connected to the stationary portion 33 through the torsion springs 32a, 32b. Further, the left movable electrode 31L is rotationally displaceable about the rotation axis AX1 of the torsion springs 32a, 32b relative to the stationary portion 33.

As illustrated in FIG. 5, the right movable electrode 31R is placed on one side of the stationary portion 33 in the x-axis direction (on the right side of FIG. 5) in the region AR1R in plan view. The right movable electrode 31R has an end 63 on the rotation axis AX1 side thereof, and the two torsion springs 32a, 32b, which are rotationally displaceable about the rotation axis AX1 extending in the y-axis direction, are connected in positions separated from each other in the y-axis direction to the end 63 through the coupling portions 38a, 38b. Therefore, the end 63 on the stationary portion 33 side of the right movable electrode 31R is connected to the stationary portion 33 through the torsion springs 32a, 32b. Further, the right movable electrode 31R is rotationally displaceable about the rotation axis AX1 of the torsion springs 32a, 32b relative to the stationary portion 33.

Further, because the left movable electrode 31L and the right movable electrode 31R are coupled to each other through the coupling portions 38a, 38b, the same rotational displacement is caused in the movable electrodes 31L, 31R.

When viewed from the z-axis direction, the left movable electrode 31L has, for example, a rectangular shape. Specifically, the left movable electrode 31L has, for example, side surfaces SM1L, SM2L perpendicular to the x-axis direction and side surfaces SM3L, SM4L perpendicular to the y-axis direction.

The side surface SM1L is the end 62 on the rotation axis AX1 side of the left movable electrode 31L, and the side surface SM2L is an end 61 on the opposite side of the left movable electrode 31L from the rotation axis AX1. In other words, the side surface SM1L is the positive side end 62 in the x-axis direction of the left movable electrode 31L, and the side surface SM2L is the negative side end 61 in the x-axis direction of the left movable electrode 31L. Also, the side surface SM3L is a negative side end 65 in the y-axis direction of the left movable electrode 31L, and the side surface SM4L is a positive side end 66 in the y-axis direction of the left movable electrode 31L.

By way of example, the left movable electrode 31L may have planar dimensions of 1684 μm (x-axis direction)×2130 μm (y-axis direction) when viewed from the z-axis direction. Also, the left movable electrode 31L may have a thickness of 0.25 mm in the z-axis direction.

When viewed from the z-axis direction, the right movable electrode 31R has, for example, a rectangular shape. Specifically, the right movable electrode 31R has, for example, side surfaces SM1R, SM2R perpendicular to the x-axis direction and side surfaces SM3R, SM4R perpendicular to the y-axis direction.

The side surface SM1R is an end 63 on the rotation axis AX1 side of the right movable electrode 31R, and the side surface SM2R is an end 64 on the opposite side of the right movable electrode 31R from the rotation axis AX1. In other words, the side surface SM1R is the negative side end 63 in the x-axis direction of the right movable electrode 31R, and the side surface SM2R is the positive side end 64 in the x-axis direction of the right movable electrode 31R. Also, the side surface SM3R is a negative side end 67 in the y-axis direction of the right movable electrode 31R, and the side surface SM4R is a positive side end 68 in the y-axis direction of the right movable electrode 31R.

Byway of example, the right movable electrode 31R may have planar dimensions of 2800 μm (x-axis direction)×2130 μm (y-axis direction) when viewed from the z-axis direction. Also, the right movable electrode 31R may have a thickness of 0.25 mm in the z-axis direction.

The distance in the x-axis direction between the rotation axis AX1 and the end 62 (side surface SM1L) on the rotation axis AX1 side of the left movable electrode 31L is assumed as distance LXLms. And, the distance in the x-axis direction between the rotation axis AX1 and the end 61 (side surface SM2L) on the opposite side of the left movable electrode 31L from the rotation axis AX1 is assumed as distance LXLme. Then, the distance LXLms may be set at 200 μm, and the distance LXLme may be set at 1884 μm.

The distance in the x-axis direction between the rotation axis AX1 and the end 63 (side surface SM1R) on the rotation axis AX1 side of the right movable electrode 31R is assumed as distance LXRms. And, the distance in the x-axis direction between the rotation axis AX1 and the end 64 (side surface SM2R) on the opposite side of the right movable electrode 31R from the rotation axis AX1 is assumed as distance LXRme. Then, the distance LXRms may be set at 200 μm, and the distance LXRme may be set at 3000 μm.

It is noted that, in the acceleration sensor 1 in accordance with the first embodiment, as illustrated in FIG. 5, the right movable electrode 31R is connected to the end 37a of the torsion spring 32a through the coupling portion 38a and also is connected to the end 37b of the torsion spring 32b through the coupling portion 38b, but the coupling portions 38a, 38b may have an infinitesimally short length in the x-axis direction. In this case, the distance LXRms may be assumed to be approximately zero because a slit with a very narrow width in the x-axis direction is created between the right movable electrode 31R and the torsion springs 32a, 32b or between the right movable electrode 31R and the stationary portion 33. The same applies to the distance LXLms.

Alternatively, the right movable electrode 31R may be connected to the stationary portion 33 without use of the torsion springs 32a, 32b. In this case, "the rotation axis AX1 side of the right movable electrode 31R" corresponds to "the stationary portion 33 side of the right movable electrode 31R", and "the opposite side of the right movable electrode 31R from the rotation axis AX1" corresponds to "the opposite side of the right movable electrode 31R from the stationary portion 33". Further, for example, "the distance in the x-axis direction between the end 63 (side surface SM1R) on the rotation axis AX1 side of the right movable electrode 31R and the rotation axis AX1" corresponds to "the distance in the x-axis direction between the end 63 (side surface SM1R) on the stationary portion 33 side of the right movable electrode 31R and the stationary portion 33". Furthermore, "the distance in the x-axis direction between the end 64 (side surface SM2R) on the opposite side of the right movable electrode 31R from the rotation axis AX1 and the rotation axis AX1" corresponds to "the distance in the x-axis direction between the end 64 (side surface SM2R) on the opposite side of the right movable electrode 31R from the stationary portion 33 and the stationary portion 33". The same applies to the left movable electrode 31L.

The acceleration sensor 1 in accordance with the first embodiment is able to sense a micro-vibration acceleration applied in the positive/negative z direction with high accuracy in conditions where a gravitational acceleration GR (9.8 ms$^{-2}$) is applied to the upper side of the base substrate 10 or the underside of the cap substrate 20, i.e., in a direction perpendicular to the xy plane (in the negative z direction).

As illustrated in FIG. 6, vibrations in the positive/negative z-axis direction can be detected with highest accuracy by placing the acceleration sensor 1 with the z axis direction being parallel to the vertical direction, specifically, the negative z-axis direction being aligned with a direction in which the gravitational acceleration GR is applied.

In the acceleration sensor 1 in accordance with the first embodiment, the mass of the left movable electrode 31L and the right movable electrode 31R and the spring constant of the torsion springs 32a, 32b are adjusted such that, during application of the gravitational acceleration GR, the end 64 on the opposite side of the right movable electrode 31R from the rotation axis AX1 is displaced negatively in the z-axis direction by about 1.3 μm as compared with no application of the gravitational acceleration GR.

A gap length GAPL is a thickness in the z-axis direction of the left space 23L created between the left movable electrode 31L and the top left electrode 21L, and also the distance in the z-axis direction between the left movable electrode 31L and the top left electrode 21L. Because of the tilting of the left movable electrode 31L rotationally displaced about the rotation axis AX1, the thickness in the z-axis direction of the left space 23L, i.e., the distance in the z-axis direction between the left movable electrode 31L and the top left electrode 21L, varies from point to point in the x-axis direction.

The thickness in the z-axis direction of the left space 23L at a center point in the x-axis direction of the left space 23L located between the left movable electrode 31L and the top left electrode 21L is defined herein as a gap length GAPL. Specifically, at the center point in the x-axis direction of a variable capacitor composed of the left movable electrode 31L and the top left electrode 21L, the distance in the z-axis direction between the left movable electrode 31L and the top left electrode 21L is defined as the gap length GAPL.

A gap length GAPR is a thickness in the z-axis direction of the right space 23R created between the right movable electrode 31R and the top right electrode 21R, and also the distance in the z-axis direction between the right movable electrode 31R and the top right electrode 21R. Because of the tilting of the right movable electrode 31R rotationally displaced about the rotation axis AX1, the thickness in the z-axis direction of the right space 23R, i.e., the distance in the z-axis direction between the right movable electrode 31R and the top right electrode 21R, varies from point to point in the x-axis direction.

The thickness in the z-axis direction of the right space 23R at a center point in the x-axis direction of the right space 23R located between the right movable electrode 31R and the top right electrode 21R is defined herein as a gap length GAPR. Specifically, at the center point in the x-axis direction of a variable capacitor composed of the right movable electrode 31R and the top right electrode 21R, the distance in the z-axis direction between the right movable electrode 31R and the top right electrode 21R is defined as the gap length GAPR.

The thickness of the gap adjustment film 12a, 12b is greater than the thickness of the gap adjustment film 22a, 22b. In the first embodiment, the gap adjustment film 12a, 12b may have a thickness of 100 μm, and the gap adjustment film 22a, 22b may have a thickness of 3 μm.

It is noted that a distance LZt is defined as a distance in the z-axis direction between the underside of the top left electrode 21L and the upper side of the left movable electrode 31L during no application of the gravitational acceleration GR in the z-axis direction, or a distance in the z-axis direction between the underside of the top right electrode 21R and the upper side of the right movable electrode 31R during no application of the gravitational acceleration GR in the z-axis direction.

The top left electrode 21L and the top right electrode 21R are placed to serve as stationary electrodes of the variable capacitor as illustrated in FIGS. 2, 3, and 6. As described above, the top left electrode 21L is also placed to face the upper side of the left movable electrode 31R, and the top right electrode 21R is placed to face the upper side of the right movable electrode 31R.

When viewed from the z-axis direction, as illustrated in FIG. 4, the left electrode 21L has, for example, a rectangular shape. Specifically, the top left electrode 21L has, for example, side surfaces SL1, SL2 perpendicular to the x-axis direction and side surfaces SL3, SL4 perpendicular to the y-axis direction.

The side surface SL1 is an end 42 on the rotation axis AX1 side of the top left electrode 21L, and the side surface SL2 is an end 41 on the opposite side of the top left electrode 21L from the rotation axis AX1. In other words, the side surface SL1 is the positive side end 42 in the x-axis direction of the top left electrode 21L, and the side surface SL2 is the negative side end 41 in the x-axis direction of the top left electrode 21L. Also, the side surface SL3 is a negative side end 45 in the y-axis direction of the top left electrode 21L, and the side surface SL4 is a positive side end 46 in the y-axis direction of the top left electrode 21L.

As illustrated in FIG. 4, the top right electrode 21R has, for example, a rectangular shape when viewed from the z-axis direction. Specifically, the top right electrode 21R has, for example, side surfaces SR1, SR2 perpendicular to the x-axis direction and side surfaces SR3, SR4 perpendicular to the y-axis direction.

The side surface SR1 is an end 43 on the rotation axis AX1 side of the top right electrode 21R, and the side surface SR2 is an end 44 on the opposite side of the top right electrode 21R from the rotation axis AX1. In other words, the side surface SR1 is the negative side end 43 in the x-axis direction of the top right electrode 21R, and the side surface SR2 is the positive side end 44 in the x-axis direction of the top right electrode 21R. Also, the side surface SR3 is a negative side end 47 in the y-axis direction of the top right electrode 21R, and the side surface SR4 is a positive side end 48 in the y-axis direction of the top right electrode 21R.

The distance in the x-axis direction between the rotation axis AX1 and the end 42 (side surface SL1) on the rotation axis AX1 side of the top left electrode 21L is assumed as distance LXLts. And, the distance in the x-axis direction between the rotation axis AX1 and the end 41 (side surface SL2) on the opposite side of the top left electrode 21L from the rotation axis AX1 is assumed as distance LXLte. Then, the distance LXLts may be set at 200 µm, and the distance LXLte may be set at 1884 µm. That is, the difference between the distance LXLte and the distance LXLts may be set to 1684 µm. Further, when the length in the y-axis direction of the top left electrode 21L is assumed as length LYLt, the length LYLt may be set at 2130 µm.

The distance in the x-axis direction between the rotation axis AX1 and the end 43 (side surface SR1) on the rotation axis AX1 side of the top right electrode 21R is assumed as distance LXRts. And, the distance in the x-axis direction between the rotation axis AX1 and the end 44 (side surface SR2) on the opposite side of the top right electrode 21R from the rotation axis AX1 is assumed as distance LXRte. Then, the distance LXRts may be set at 200 µm, and the distance LXRte may be set at 2560 µm. That is, the difference between the distance LXRte and the distance LXRts may be set to 2360 µm. Further, when the length in the y-axis direction of the top right electrode 21R is assumed as length LYRt, the length LYRt may be set at 2130 µm.

In the acceleration sensor 1 in accordance with the first embodiment, the left movable electrode 31L and the right movable electrode 31R are provided for high-accuracy detection of acceleration with a micro-vibration component which is acceleration applied aside from the gravitational acceleration GR when the gravitational acceleration GR is applied in the negative z-axis direction. The left movable electrode 31L and the right movable electrode 31R have an adequately great difference in mass for a sufficient increase in a force that is applied to the left movable electrode 31L and the right movable electrode 31R through acceleration.

By applying acceleration with a micro-vibration component to the left movable electrode 31L and the right movable electrode 31R, a force applied to the left movable electrode 31L and the right movable electrode 31R through this acceleration acts on the left movable electrode 31L and the right movable electrode 31R as torque about the rotation axis AX1 to cause rotational displacement of the left movable electrode 31L and a right movable electrode 31R around the rotation axis AX1.

A non-parallel plate capacitor is composed of the left movable electrode 31L and the top left electrode 21L with the left space 23L interposed between them. As illustrated in FIG. 6, as viewed from the negative side toward the positive side in the y-axis direction, when the left movable electrode 31L is rotationally displaced in a clockwise direction, a capacitance CL of the non-parallel plate capacitor between the left movable electrode 31L and the top left electrode 21L increases. On the other hand, as viewed from the negative side toward the positive side in the y-axis direction, when the left movable electrode 31L is rotationally displaced in a counterclockwise direction, the capacitance CL of the non-parallel plate capacitor between the left movable electrode 31L and the top left electrode 21L decreases.

The non-parallel plate capacitor between the left movable electrode 31L and the top left electrode 21L is a region in which the left movable electrode 31L and the top left electrode 21L cross each other when viewed from the z-axis direction. Likewise, a non-parallel plate capacitor between the right movable electrode 31R and the top right electrode 21R is a region in which the right movable electrode 31R and the top right electrode 21R cross each other when viewed from the z-axis direction.

The non-parallel plate capacitor is composed of the right movable electrode 31R and the top right electrode 21R with the right space 23R interposed between them. As illustrated in FIG. 6, as viewed from the negative side toward the positive side in the y-axis direction, when the right movable electrode 31R is rotationally displaced in a clockwise direction, a capacitance CR of the non-parallel plate capacitor between the right movable electrode 31R and the top right electrode 21R decreases, contrary to the capacitance CL. On the other hand, as viewed from the negative side toward the positive side in the y-axis direction, when the right movable electrode 31R is rotationally displaced in a counterclockwise direction, the capacitance CR of the non-parallel plate capacitor between the right movable electrode 31R and the top right electrode 21R increases, contrary to the capacitance CL.

Where vibration acceleration in the vertical direction which is lower than the gravitational acceleration GR is input to the acceleration sensor 1 in accordance with the first embodiment, the left movable electrode 31L and the right movable electrode 31R vibrate in the rotational displacement direction. Therefore, a capacitance value of the capacitance CL and a capacitance value of the capacitance CR vibrate in opposite phase to each other. Therefore, the acceleration sensor 1 detects acceleration vibration in the vertical direction which is smaller than the gravity, on the basis of a capacitance difference between the capacitance CL detected by the detection circuit and the capacitance CR detected by the detection circuit, i.e., on the basis of an output ΔC calculated by ΔC=CL−CR. In short, the acceleration sensor 1 detects an acceleration based on the capacitance CL and the capacitance CR.

<About Impact of Gravitational Acceleration in Rest Position>

The impact of the gravitational acceleration in a rest position will be described below in comparison with a first comparative example illustrated in FIG. 7 to FIG. 13.

Figure 7:
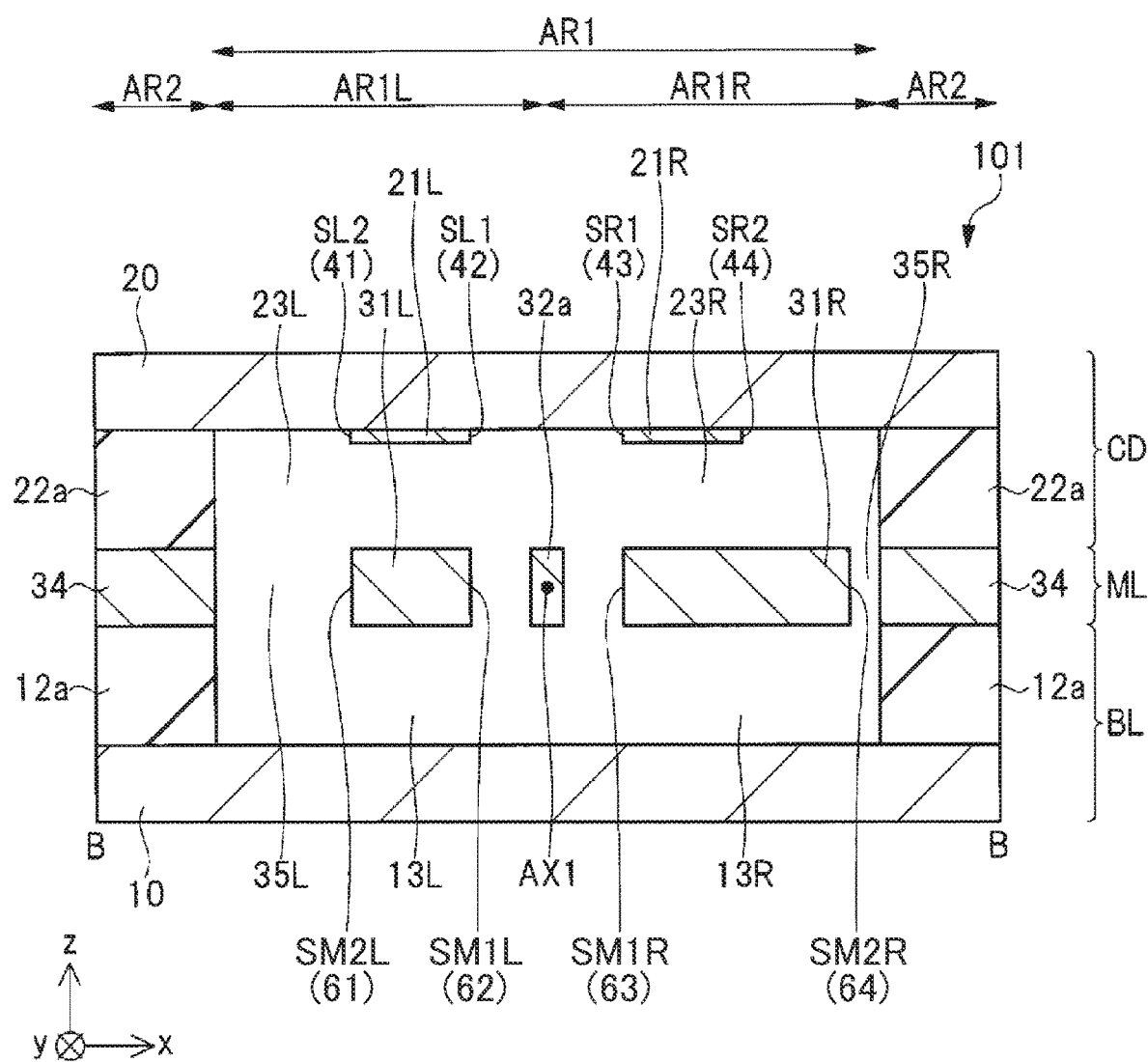
FIG. 7 is a sectional view of an acceleration sensor in accordance with a first comparative example.
Figure 8:
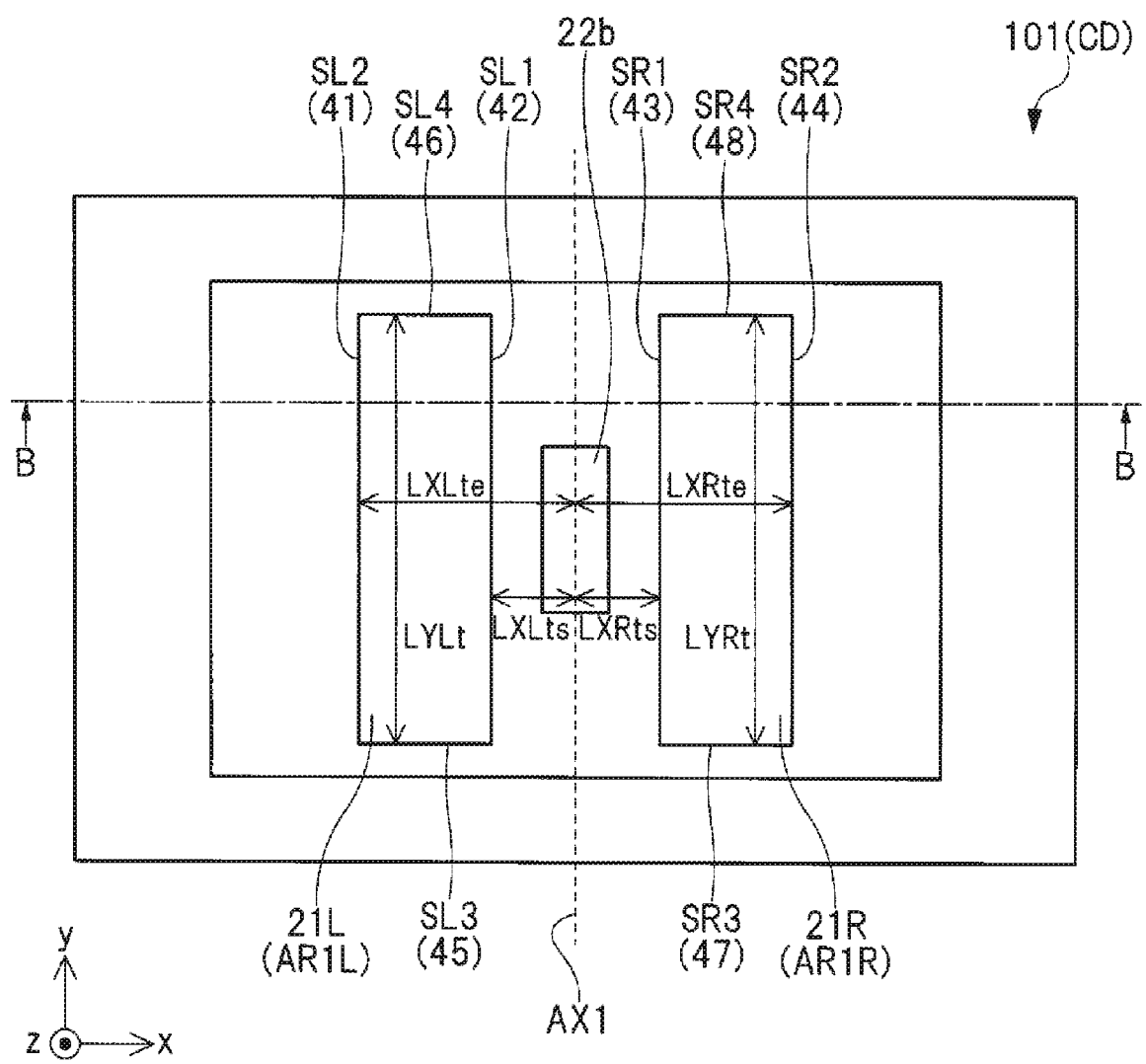
FIG. 8 is a plan view of the acceleration sensor in accordance with the first comparative example.
Figure 9:
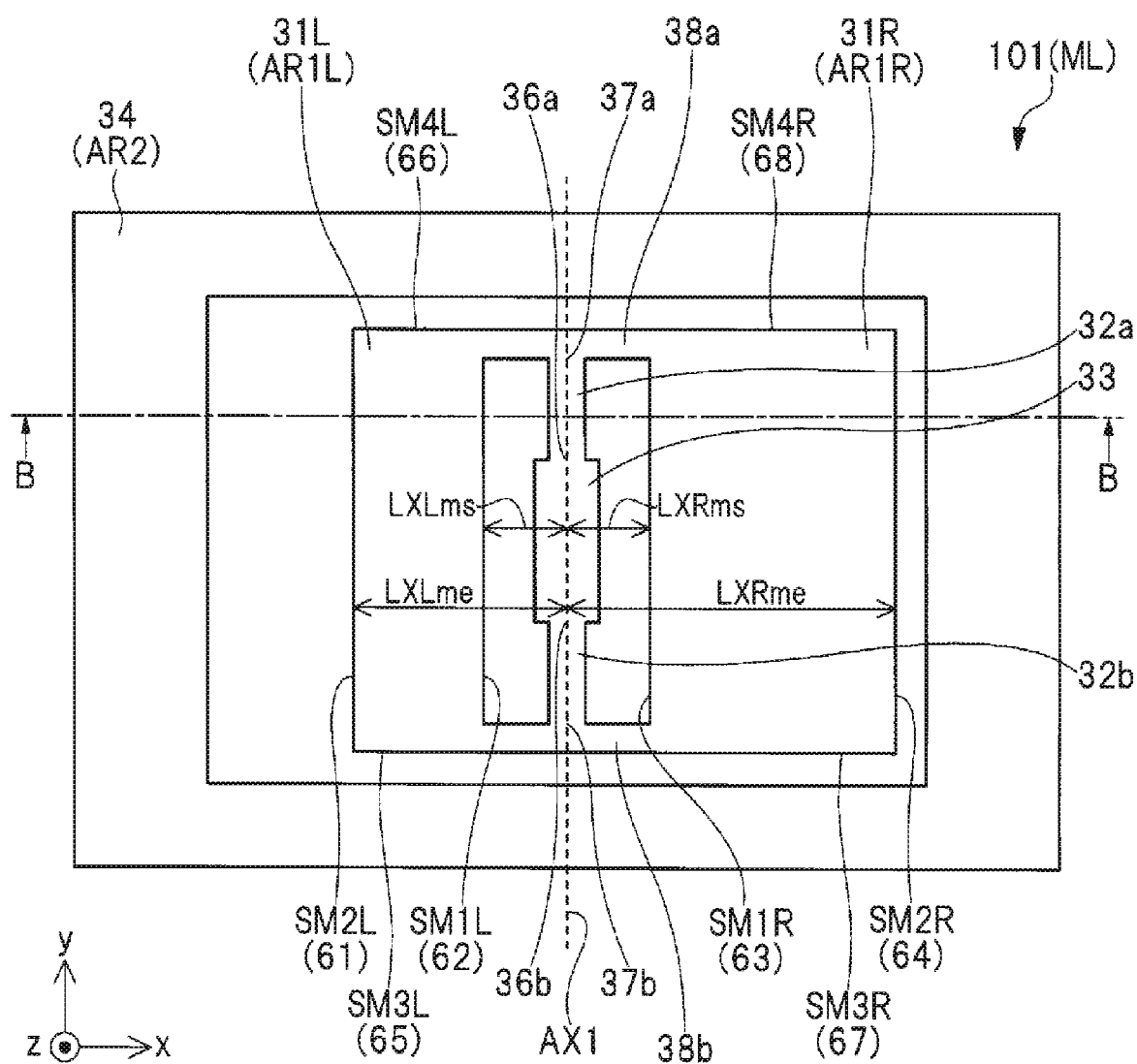
FIG. 9 is a plan view of the acceleration sensor in accordance with the first comparative example.
Figure 10:
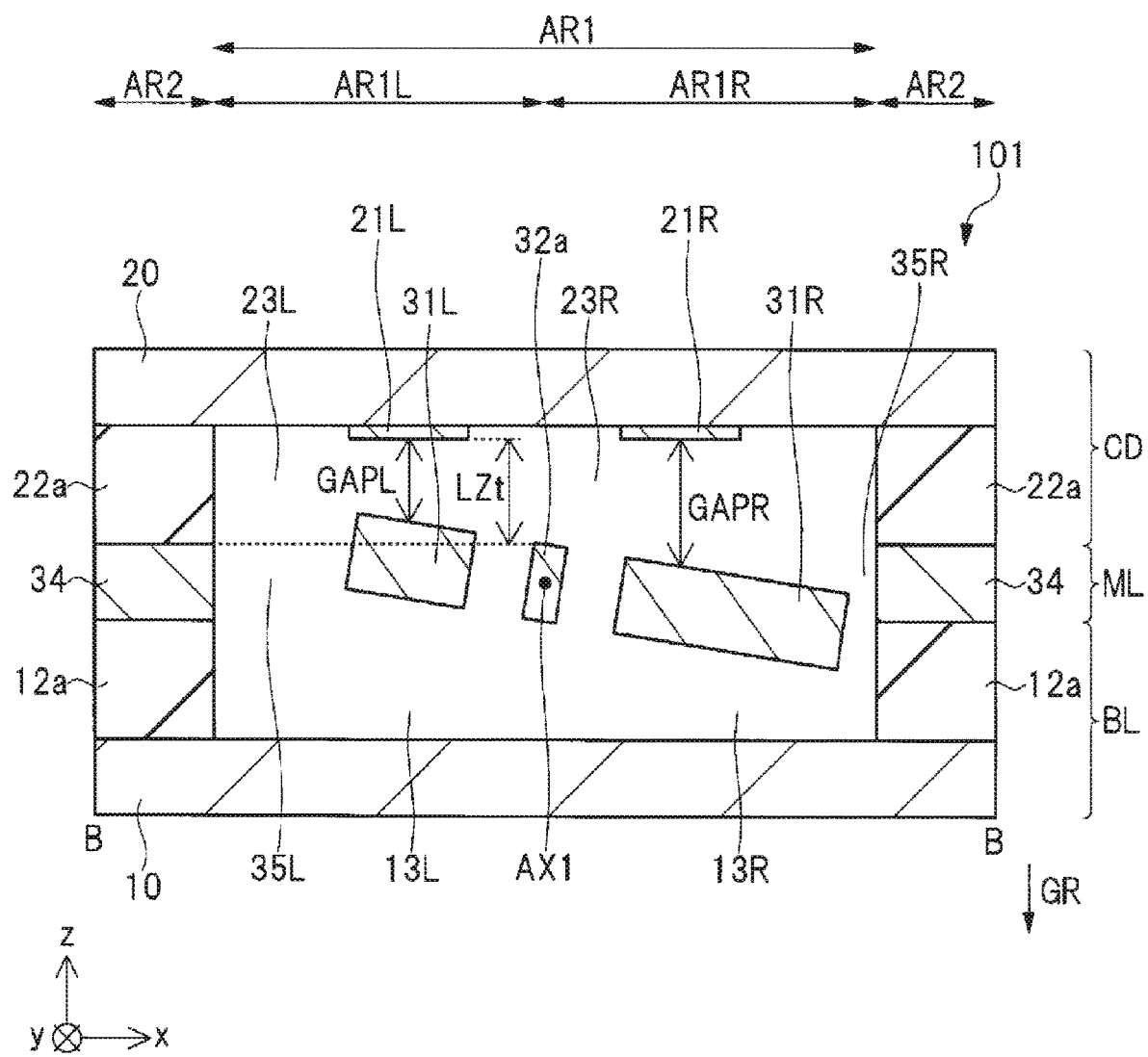
FIG. 10 is a sectional view of the acceleration sensor in accordance with the first comparative example.

FIG. 7 is a sectional view of an acceleration sensor in accordance with a first comparative example. FIGS. 8 and 9 are plan views of the acceleration sensor in accordance with the first comparative example. FIG. 10 is a sectional view of the acceleration sensor in accordance with the first comparative example.

FIGS. 7 and 10 are sectional views taken along line B-B of FIGS. 8 and 9. FIG. 7 illustrates the state of gravitational acceleration being not applied in the z-axis direction, and FIG. 10 illustrates the state of gravitational acceleration being applied in the negative z-axis direction. That is, FIG. 10 illustrates the state of a movable electrode being rotationally displaced about a rotation axis by the gravitational acceleration.

As illustrated in FIG. 7, an acceleration sensor 101 in the first comparative example has the base layer BL, the membrane layer ML and the cap layer CD as in the case of the acceleration sensor 1 in accordance with the first embodiment. The base layer BL has the base substrate 10, the gap adjustment films 12a, 12b, the left space 13L and the right space 13R. The gap layer CD has the gap substrate 20, the top left electrode 21L, the top right electrode 21R, the gap adjustment films 22a, 22b, the left space 23L, and the right space 23R. The membrane layer ML has the left movable electrode 31L, the right movable electrode 31R, the torsion springs 32a, 32b, the stationary portion 33 and the frame 34.

As illustrated in FIG. 9, the left movable electrode 31L included in the membrane layer ML is formed of a low resistivity, single crystalline silicon substrate, and has, for example, a rectangular shape when viewed from the z-axis direction, as in the case of the left movable electrode 31L of the acceleration sensor 1 in accordance with the first embodiment. The left movable electrode 31L may have planar dimensions of 1684 μm (x-axis direction)×2500 μm (y-axis direction) when viewed from the z-axis direction. Also, the left movable electrode 31L may have a thickness of 0.25 mm in the z-axis direction.

As illustrated in FIG. 9, the right movable electrode 31R included in the membrane layer ML is formed of a low resistivity, single crystalline silicon substrate, and has, for example, a rectangular shape when viewed from the z-axis direction, as in the case of the right movable electrode 31R of the acceleration sensor 1 in accordance with the first embodiment. The right movable electrode 31R may have planar dimensions of 2800 μm (x-axis direction)×2500 μm (y-axis direction) when viewed from the z-axis direction. Also, the left movable electrode 31L may have a thickness of 0.25 mm in the z-axis direction.

As illustrated in FIG. 10, the gap length GAPL is a thickness in the z-axis direction of the left space 23L created between the left movable electrode 31L and the top left electrode 21L, and also the distance in the z-axis direction between the left movable electrode 31L and the top left electrode 21L. As in the case of the first embodiment, in the first comparative example, the thickness in the z-axis direction of the left space 23L at a central point of the top left electrode 21L in the x-axis direction is also defined as a gap length GAPL.

As illustrated in FIG. 10, the gap length GAPR is a thickness in the z-axis direction of the right space 23R created between the right movable electrode 31R and the top right electrode 21R, and also the distance in the z-axis direction between the right movable electrode 31R and the top right electrode 21R. As in the case of the first embodiment, in the first comparative example, the thickness in the z-axis direction of the right space 23R at a central point of the top right electrode 21R in the x-axis direction is also defined as a gap length GAPR.

The top left electrode 21L and the top right electrode 21R are arranged to be flush with each other as illustrated in FIG. 7 and FIG. 10.

As illustrated in FIG. 8, the distance in the x-axis direction between the rotation axis AX1 and the end 42 (side surface SL1) on the rotation axis AX1 side of the top left electrode 21L is assumed as distance LXLts. And, the distance in the x-axis direction between the rotation axis AX1 and the end 41 (side surface SL2) on the opposite side of the top left electrode 21L from the rotation axis AX1 is assumed as distance LXLte. Then, in the first comparative example, the distance LXLts may be set at 200 μm, and the distance LXLte may be set at 1884 μm.

The distance in the x-axis direction between the rotation axis AX1 and the end 43 (side surface SR1) on the rotation axis AX1 side of the top right electrode 21R is assumed as distance LXRts. And, the distance in the x-axis direction between the rotation axis AX1 and the end 44 (side surface SR2) on the opposite side of the top right electrode 21R from the rotation axis AX1 is assumed as distance LXRte. Then, in the first comparative example, the distance LXRts may be set at 200 μm, and the distance LXRte may be set at 1884 μm, which is equal to the distance LXLte.

As in the case of the acceleration sensor 1 in accordance with the first embodiment, in the acceleration sensor 101 in accordance with the first comparative example, the mass of the left movable electrode 31L and the right movable electrode 31R and the spring constant of the torsion springs 32a, 32b are adjusted such that, during application of the gravitational acceleration GR, the end 64 on the opposite side of the right movable electrode 31R from the rotation axis AX1 is displaced negatively in the z-axis direction by about 1.3 μm as compared with no application of the gravitational acceleration GR.

In the acceleration sensor 101 in accordance with the first comparative example, the gap adjustment film 12a, 12b has a thickness sufficiently greater than the thickness of the gap adjustment film 22a, 22b. In the first comparative example, the thickness of the gap adjustment film 12a, 12b may be set at 100 μm, and the thickness of the gap adjustment film 22a, 22b may be set at 3 μm.

Figure 11:
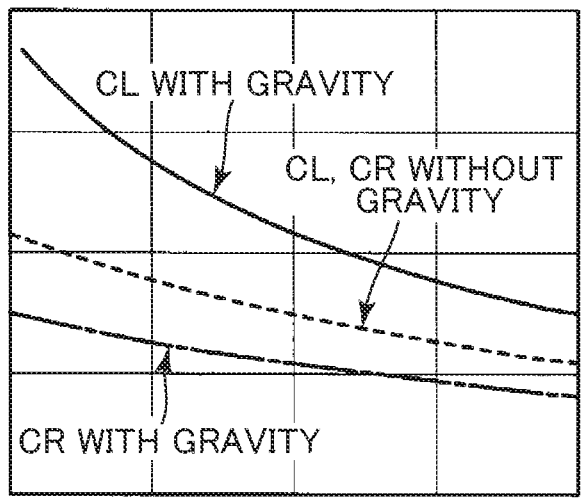
FIG. 11 is a graph diagram illustrating the rotational angle dependence of capacitance between a left movable electrode and a top left electrode and capacitance between a right movable electrode and a top right electrode in the acceleration sensor in accordance with the first comparative example.

FIG. 11 is a graph diagram illustrating the rotational angle dependence of capacitance CL between the left movable electrode 31L and the top left electrode 21L and capacitance CR between the right movable electrode 31R and the top right electrode 21R in the acceleration sensor in accordance with the first comparative example.

The horizontal axis of FIG. 11 represents a variation ΔθL in rotational angle (the counterclockwise direction is positive) with respect to the rotational angle of the left movable electrode 31L when the gravitational acceleration GR is applied in the negative z-axis direction and also the left movable electrode 31L and the right movable electrode 31R are not vibrated, that is, with respect to the rotational angle of the left movable electrode 31L in the rest state where the gravitational acceleration GR is applied. The horizontal axis of FIG. 11 also represents a variation ΔθR in rotational angle (the clockwise direction is positive) with respect to the rotational angle of the right movable electrode 31R when the gravitational acceleration GR is applied in the negative z-axis direction and also the left movable electrode 31L and the right movable electrode 31R are not vibrated, that is, with respect to the rotational angle of the right movable electrode 31R in the rest state where the gravitational acceleration GR is applied.

In other words, the variation $\Delta\theta L$ is the amount of rotational angle offset when the left movable electrode 31L is displaced rotationally about the rotation axis AX1 from the rest state where the gravitational acceleration GR is applied. Also, the variation $\Delta\theta R$ is the amount of rotational angle offset when the right movable electrode 31R is displaced rotationally about the rotation axis AX1 from the rest state where the gravitational acceleration GR is applied.

In FIG. 11, the solid line shows the variation $\Delta\theta L$ dependence of the capacitance CL in conditions where the gravitational acceleration GR is applied (denoted as "CL with gravity" in FIG. 11), and the dash-dot line shows the variation $\Delta\theta R$ dependence of the capacitance CR in conditions where the gravitational acceleration GR is applied (denoted as "CR with gravity" in FIG. 11).

It is noted that, in FIG. 11, the broken line shows the variation $\Delta\theta L$ dependence of the rotational angle of the left movable electrode 31L of the capacitance CL and the variation $\Delta\theta R$ dependence of the rotational angle of the right movable electrode 31R of the capacitance CR, in conditions where no gravitational acceleration GR is applied (denoted as "CL, CR without gravity" in FIG. 11).

When the gravitational acceleration GR is not applied, the left movable electrode 31L and the right movable electrode 31R rest in a horizontal position as illustrated in FIG. 7. Therefore, the variation $\Delta\theta L$ dependence of the rotational angle of the capacitance CL and the variation $\Delta\theta R$ dependence of the capacitance CR match each other.

When the gravitational acceleration GR is applied in the vertical direction (negative z-axis direction), the left movable electrode 31L and the right movable electrode 31R are rotationally displaced in the counterclockwise direction when viewed from the negative side toward the positive side in the y-axis direction as illustrated in FIG. 10, so that the gap length GAPL decreases by about 0.5 μm, while the gap length GAPR increases by about 0.5 μm. Therefore, where $\Delta\theta L=\Delta\theta R=0$, or, in the rest state where the gravitational acceleration GR is applied, the capacitance value of the capacitance CL and the capacitance value of the capacitance CR are different from each other.

As described above, typically, an acceleration sensor detects acceleration on the basis of a capacitance difference between a capacitance value of the capacitance CL and a capacitance value of the capacitance CR. That is, the output $\Delta C$ of the acceleration sensor is a capacitance difference between the capacitance value of the capacitance CL and the capacitance value of the capacitance CR, and the acceleration is detected based on the output $\Delta C$. Because of this, it is desirable that, in the capacitance difference between the capacitance value of the capacitance CR and the capacitance value of the capacitance CL, a capacitance value of the capacitance CR corresponding to the gravitational acceleration GR and a capacitance value of the capacitance CL corresponding to the gravitational acceleration GR are cancelled.

Specifically, in conditions where the gravitational acceleration GR is applied and a vertical vibration acceleration lower than the gravitational acceleration GR is not applied, when the left movable electrode 31L and the right movable electrode 31R are in the rest state, it is desirable that the capacitance value of the capacitance CL corresponding to the gravitational acceleration GR and the capacitance value of the capacitance CR corresponding to the gravitational acceleration GR are equal to each other.

Here, in conditions where the gravitational acceleration GR is applied and also the vertical vibration acceleration smaller than the gravitational acceleration GR is not applied, when the left movable electrode 31L and the right movable electrode 31R are in a rest state, if the capacitance value of the capacitance CL and the capacitance value of the capacitance CR are not cancelled, this causes a significant reduction in accuracy of sensing the vertical vibration acceleration smaller than the gravitational acceleration GR.

For instance, assuming that the capacitance value of the capacitance CR and the capacitance value of the capacitance CL differ only in capacitance value corresponding to the gravitational acceleration GR from each other when the left movable electrode 31L and the right movable electrode 31R are in the rest state, in conditions where the gravitational acceleration GR is applied and also the vertical vibration acceleration smaller than the gravitational acceleration GR is not applied. Even in such a case, as a detector for measurement of vibration of amplitude corresponding to an acceleration of one-thousandth of the gravitational acceleration GR, i.e., GR/1000, with 1% measurement accuracy, the detector used needs to have six-digit accuracy of measurement in order to achieve separation between $(1+\frac{1}{1000}-\frac{1}{100000})GR$ and $(1+\frac{1}{1000}+\frac{1}{100000})GR$.

On the other hand, assuming that the capacitance value of the capacitance CR and the capacitance value of the capacitance CL are equal to each other when the left movable electrode 31L and the right movable electrode 31R are in the rest state, in conditions where the gravitational acceleration GR is applied and also the vertical vibration acceleration smaller than the gravitational acceleration GR is not applied. That is, assuming that the capacitance value of the capacitance CR and the capacitance value of the capacitance CL are cancelled.

Even in such a case, as a detector for measurement of vibration of amplitude corresponding to an acceleration of one-thousandth of the gravitational acceleration GR, i.e., GR/1000, with 1% measurement accuracy, the detector used needs only to have three-digit accuracy of measurement in order to achieve separation between $(1+\frac{1}{1000}-\frac{1}{100000})GR$ and $(1+\frac{1}{1000}+\frac{1}{100000})GR$.

Specifically, if the capacitance difference between the capacitance value of the capacitance CL and the capacitance value of the capacitance CR increases during the rest state in which the gravitational acceleration GR is applied, the acceleration sensor is required to have a wider dynamic range. This may cause an increase in power consumption of the detection circuit of the acceleration sensor. On the other hand, if the dynamic range is not able to be increased, this may cause a reduction in the accuracy needed to measure acceleration in the acceleration sensor or alternatively a reduction in the sensitivity to acceleration.

The inventors have considered in detail the rotation angel $\theta$ dependence of the capacitance value of the capacitance CL between the left movable electrode 31L and the top left electrode 21L and the capacitance value of the capacitance CR between the right movable electrode 31R and the top right electrode 21R when the rotational angle of the left movable electrode 31L and the right movable electrode 31R is at a rotational angle $\theta$ (where zero degrees is reached in the horizontal state and the clockwise direction is positive, see FIG. 6) in the acceleration sensor 1 according to the first embodiment. As a result, the inventors have found that the capacitance value of the capacitance CR and the capacitance value of the capacitance CL satisfy the following formulas (1) to (5).

Formula 1

$$CL = \frac{\varepsilon(SL)\ln(1+\gamma_L)}{\{(LXLte)-(LXLts)\}\tan\theta} \quad \text{Ex. (1)}$$

$$CR = \frac{\varepsilon(SR)\ln(1+\gamma_R)}{\{(LXRte)-(LXRts)\}\tan\theta} \quad \text{Ex. (2)}$$

where

Formula 2

$$\gamma_L = \frac{\{(LXLte)-(LXLts)\}\tan\theta}{(LZt)-(LXLte)\tan\theta} \quad \text{Ex. (3)}$$

$$\gamma_R = \frac{\{(LXRte)-(LXRts)\}\tan\theta}{(LZt)-(LXRts)\tan\theta} \quad \text{Ex. (4)}$$

Further,

Formula 3

$$\tan\theta = \frac{2(GAPL)}{(LXRts)+(LXRte)} = \frac{2(GAPR)}{(LXLts)+(LXLte)} \quad \text{Ex. (5)}$$

Further, ε is a permittivity of the gas occupying the left space 23L and the right space 23R, SL is an active electrode area corresponding to the capacitance CL and SR is an active electrode area corresponding to the capacitance CR.

In the first embodiment, the area of the top left electrode 21L is equal to the area of the left movable electrode 31L, but the area of the top right electrode 21R is smaller than the area of the right movable electrode 31R. Because of this, the active electrode area corresponding to the capacitance CL is the area of the top left electrode 21L (which is equal to the area of the left movable electrode 31L), and the active electrode area corresponding to the capacitance CR is the area of the top right electrode 21R.

In formulas (1) to (5), when the rotational angle θ approaches zero, the capacitance value of the capacitance CL in formula (1) and the capacitance value of the capacitance CR in formula (2) approaches asymptotically to a formula for capacitance of a parallel plate capacitor. Accordingly, formulas (1) to (5) may be formulas with consideration given to tilting of the left movable electrode 31L and the right movable electrode 31R.

Figure 12:
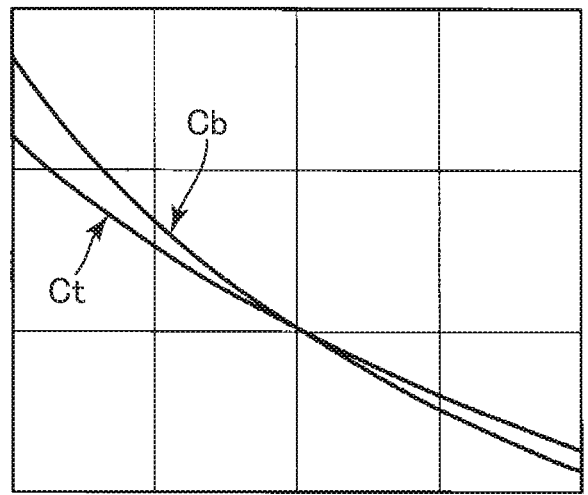
FIG. 12 is a graph diagram illustrating the rotational angle dependence of capacitance between a left movable electrode and a top left electrode and capacitance between a right movable electrode and a top right electrode in the acceleration sensor in accordance with the first embodiment.

FIG. 12 is a graph diagram showing the rotational angle dependence of the capacitance CL between the left movable electrode 31L and the top left electrode 21L and the capacitance CR between the right movable electrode 31R and the top right electrode 21R in the acceleration sensor in accordance with the first embodiment. The horizontal axis of FIG. 12 represents the variation ΔθL in rotational angle and the variation ΔθR in rotational angle, similarly to the horizontal axis of FIG. 11.

As illustrated in FIG. 12, in the first embodiment, where ΔθL=ΔθR=0, the capacitance value of the capacitance CL is equal to the capacitance value of the capacitance CR. However, where ΔθL=ΔθR≠0, the capacitance value of the capacitance CL and the capacitance value of the capacitance CR differs from each other. This is because a first derivative CL' of the capacitance CL in ΔθL=ΔθR=0 and a first derivative CR' of the capacitance CR are not equal to each other and also a second derivative CR" of the capacitance CR in ΔθL=ΔθR=0 and a second derivative CL" of the capacitance CL are not equal to each other.

This is because, as described above using formulas (1) to (5), the inventors have taken into account that the left movable electrode 31L and the right movable electrode 31R are inclined, and this is a phenomenon caused by inclining the left movable electrode 31L and the right movable electrode 31R.

<Essential Features and Effects of Acceleration Sensor According to First Embodiment>

As described above, in the acceleration sensor 1 according to the first embodiment, the distance LXLts and the distance LXRts are equal to each other and the distance LXLte is shorter than the distance LXRte.

As a result, in conditions where the gravitational acceleration GR is applied and a vertical vibration acceleration lower than the gravitational acceleration GR is not applied, when the left movable electrode 31L and the right movable electrode 31R are in the rest state, the capacitance value of the capacitance CL and the capacitance value of the capacitance CR become equal to each other.

Thus, according to the first embodiment, since the accuracy of sensing vertical vibration acceleration lower than the gravitational acceleration GR is improved, an acceleration sensor with high sensitivity and low power consumption can be provided.

Second Embodiment

<Configuration of Acceleration Sensor>

The configuration of an acceleration sensor in accordance with a second embodiment will be described with reference to FIG. 13 to FIG. 17.

Figure 13:
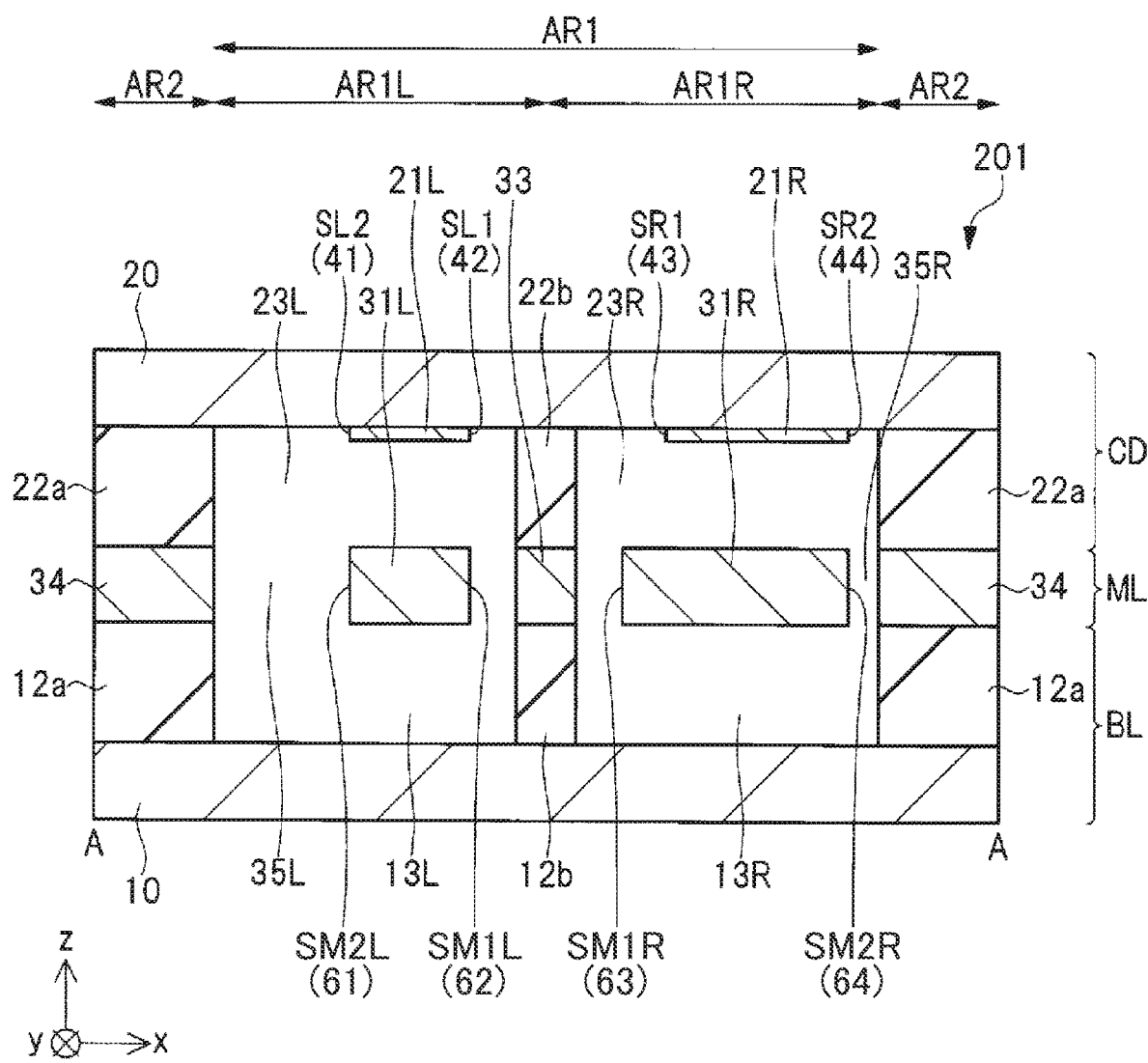
FIG. 13 is a sectional view of an acceleration sensor in accordance with a second embodiment.
Figure 15:
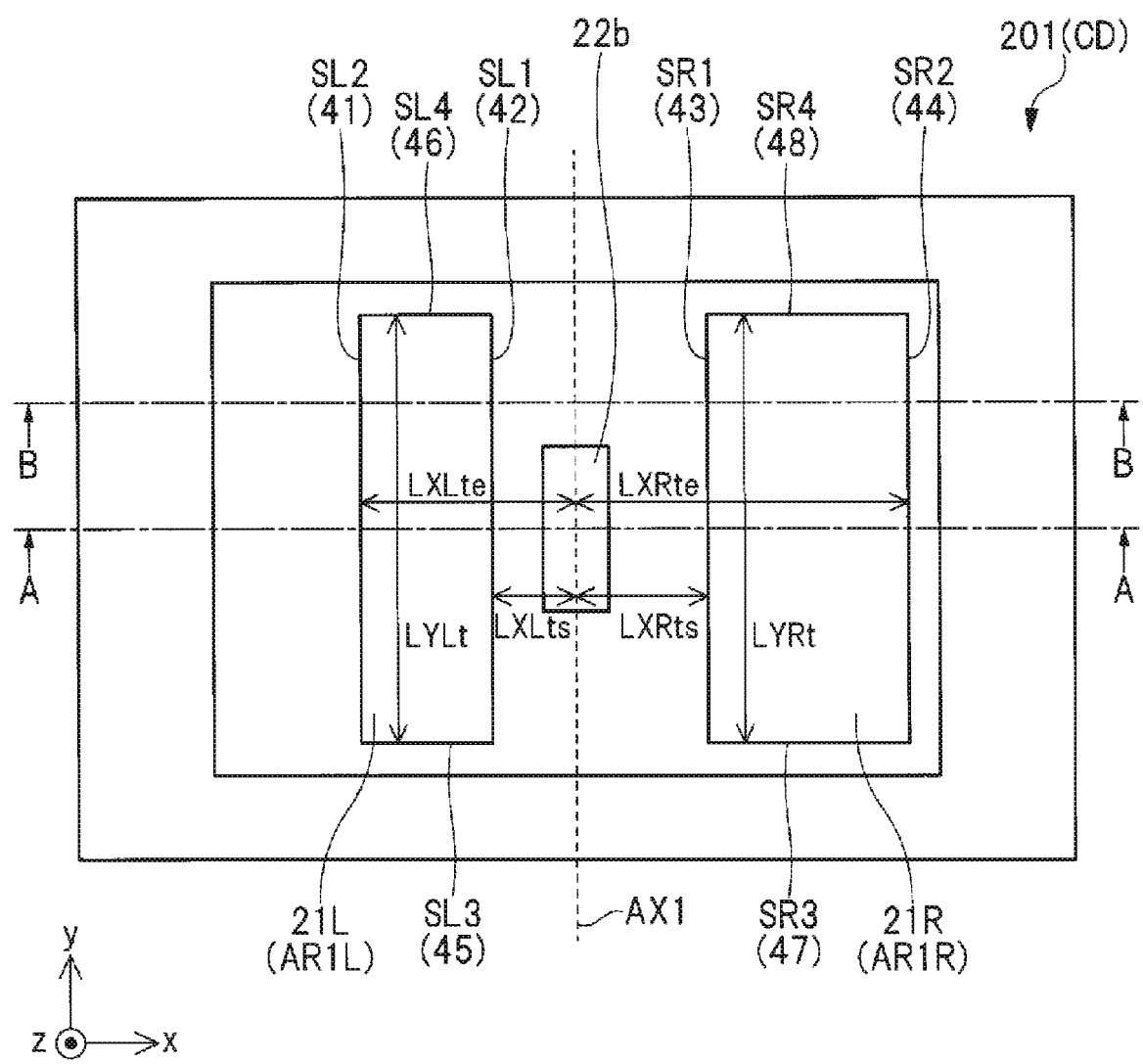
FIG. 15 is a plan view of the acceleration sensor in accordance with the second embodiment.
Figure 16:
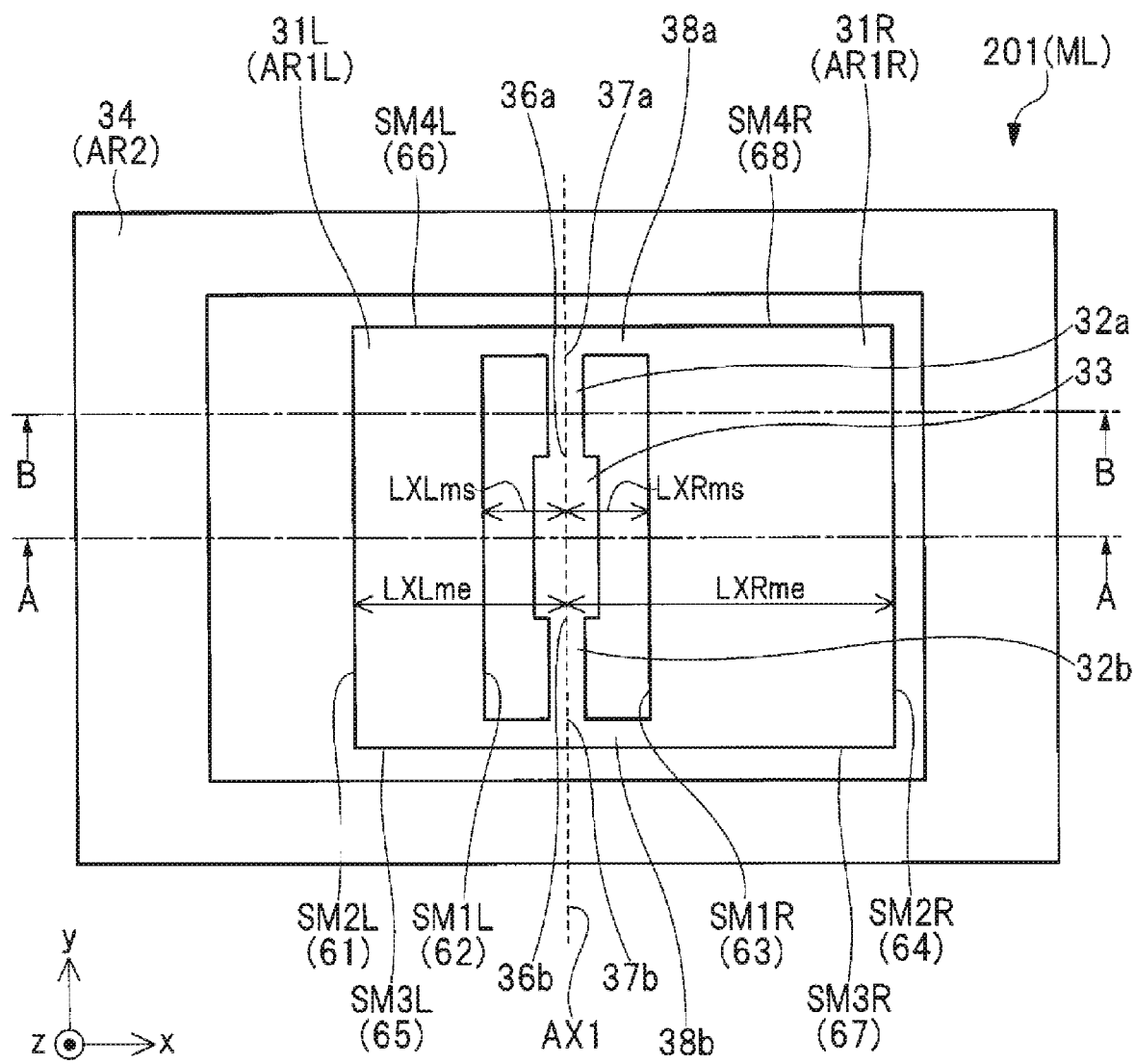
FIG. 16 is a plan view of the acceleration sensor in accordance with the second embodiment.
Figure 17:
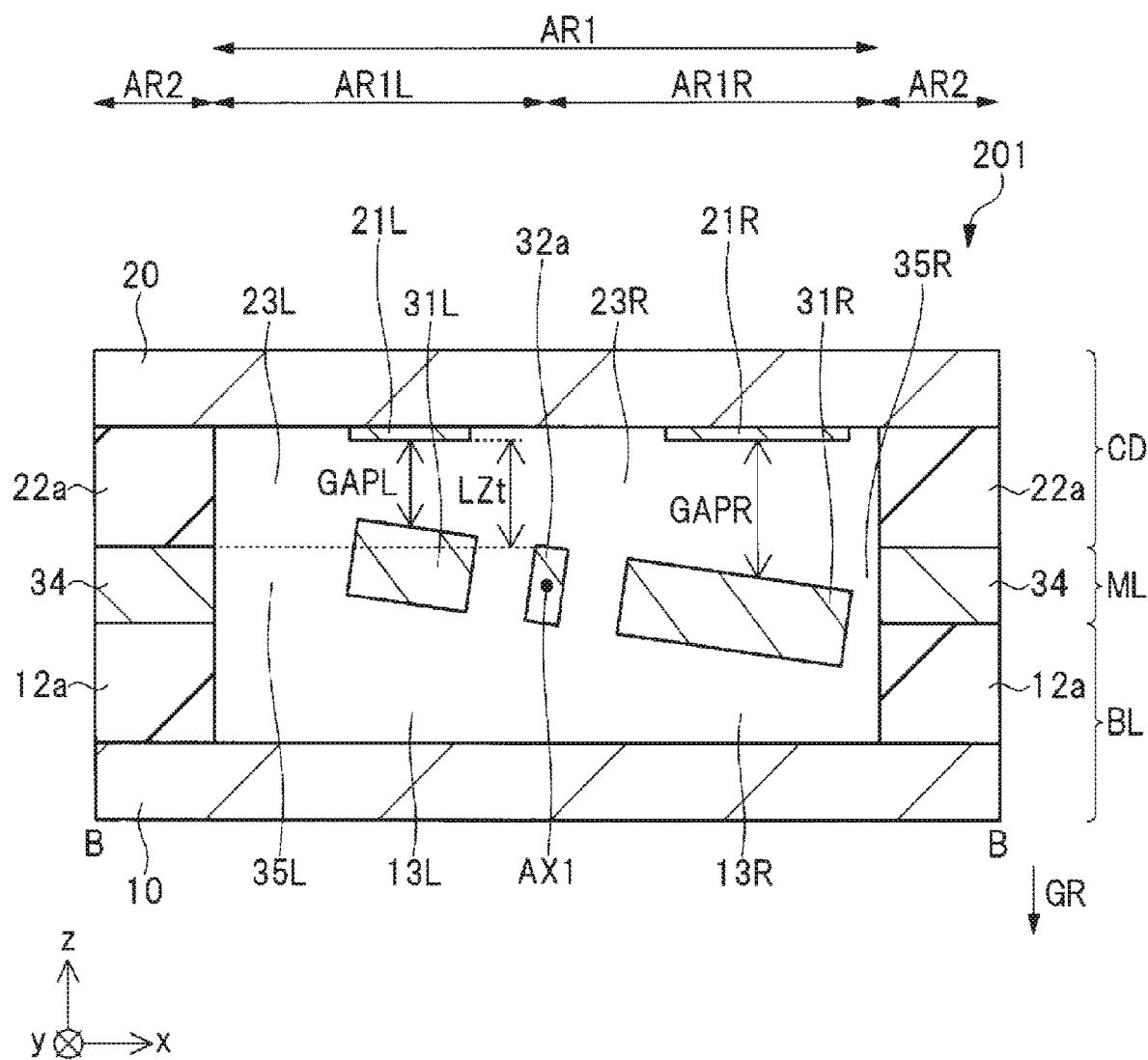
FIG. 17 is a sectional view of the acceleration sensor in accordance with the second embodiment.

FIG. 13 and FIG. 13 are sectional view of the acceleration sensor in accordance with the second embodiment. FIG. 15 and FIG. 16 are plan views of the acceleration sensor in accordance with the second embodiment. FIG. 17 is a sectional view of the acceleration sensor in accordance with the second embodiment.

Figure 14:
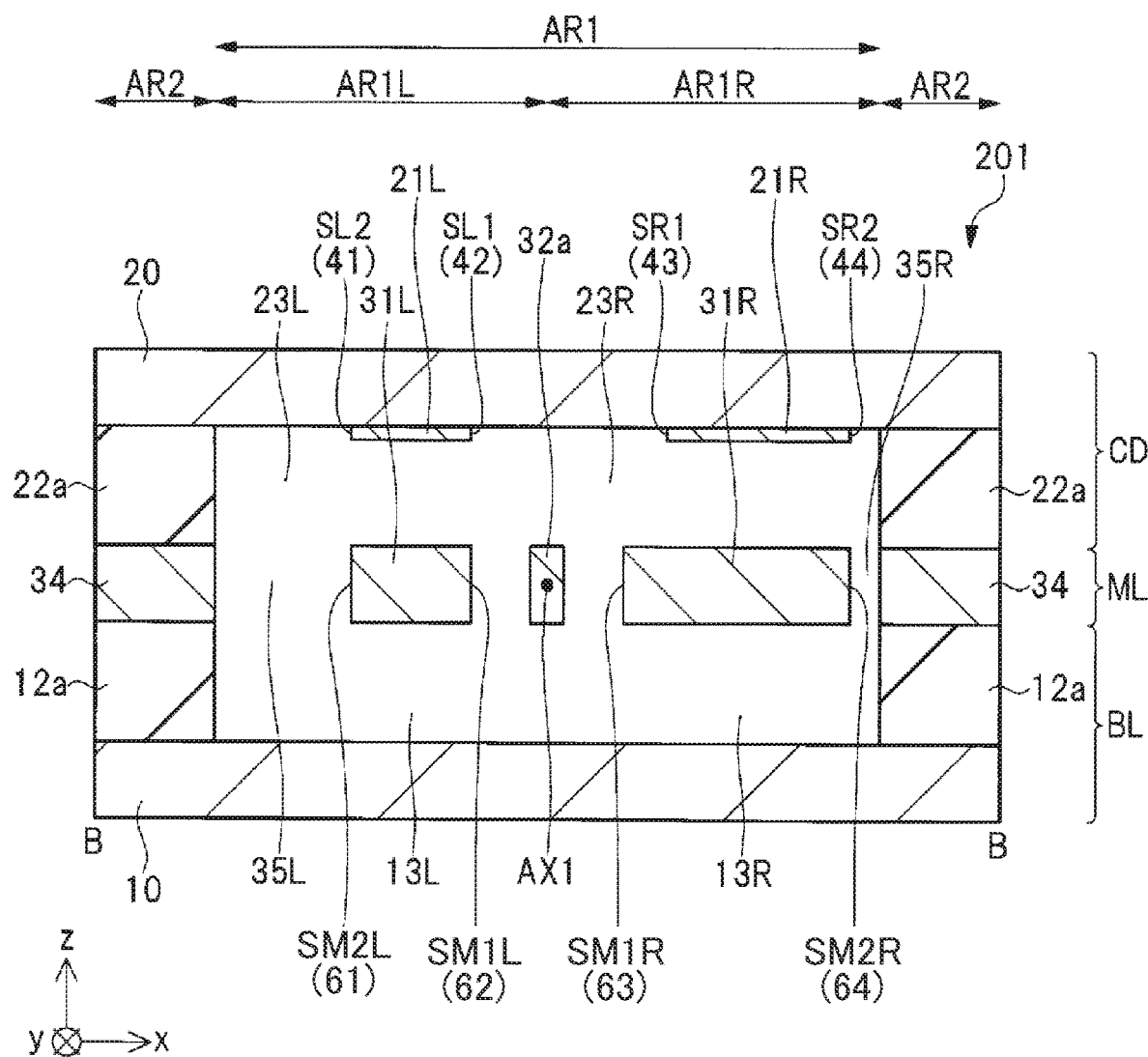
FIG. 14 is a sectional view of the acceleration sensor in accordance with the second embodiment.

FIG. 13 is the sectional view taken along line A-A of FIG. 15 and FIG. 16, and FIG. 14 and FIG. 17 are the sectional views taken along line B-B of FIG. 15 and FIG. 16. FIG. 13 and FIG. 14 illustrate the state of gravitational acceleration being not applied in a z-axis direction, and FIG. 17 illustrates the state of gravitational acceleration being applied in a negative z-axis direction. Specifically, FIG. 17 illustrates the state of a left movable electrode and a right movable electrode being rotationally displaced about a rotation axis by the gravitational acceleration.

FIG. 15 illustrates a state of the underside of a cap layer. FIG. 16 illustrates the state of removing the cap layer and being transparently viewed from a positive z direction, or the state of a membrane layer.

As illustrated in FIGS. 13 to 17, an acceleration sensor 201 in accordance with the second embodiment has the base layer BL, the membrane layer ML and the cap layer CD as in the case of the above-described acceleration sensor 1 in accordance with the first embodiment. The base layer BL has the base substrate 10, the gap adjustment films 12a, 12b, the left space 13L and the right space 13R. The gap layer CD has the gap substrate 20, the top left electrode 21L, the top right electrode 21R, the gap adjustment films 22a, 22b, the left space 23L, and the right space 23R. The membrane layer ML has the left movable electrode 31L, the right movable electrode 31R, the torsion springs 32a, 32b, the stationary portion 33 and the frame 34.

A point of difference between the acceleration sensor 201 in accordance with the second embodiment and the acceleration sensor 1 in accordance with the first embodiment is the distance LXLts in the x-axis direction between the rotation axis AX1 and the end 42 (side surface SL1) on the rotation axis AX1 side of the top left electrode 21L, and the distance LXRts in the x-axis direction between the rotation axis AX1 and the end 43 (side surface SR1) on the rotation axis AX1 side of the top right electrode 21R.

Specifically, in the aforementioned acceleration sensor 1 in accordance with the first embodiment, the distance LXLts and the distance LXRts are equal to each other. In contrast to this, the acceleration sensor 201 in accordance with the second embodiment has a feature that the distance LXLts is shorter than the distance LXRts, the distance LXLte is also shorter than the distance LXRte, and a difference between the distance LXLte and the distance LXLts is shorter than a difference between the distance LXRte and the distance LXRts.

In the acceleration sensor 201 in accordance with the second embodiment, the distance LXLts may be 200 μm, and the distance LXLte may be 1884 μm. Thus, a difference between the distance LXLte and the distance LXLts may be 1684 μm.

On the other hand, the distance LXRts may be 529 μm, and the distance LXRte may be 3000 μm. Thus, a difference between the distance LXRte and the distance LXRts may be 2471 μm.

Figure 18:
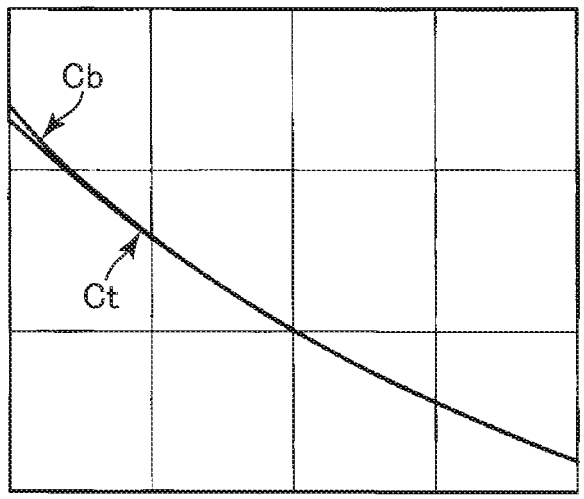
FIG. 18 is a graph diagram illustrating the rotational angle dependence of capacitance between a left movable electrode and a top left electrode and capacitance between a right movable electrode and a top right electrode in the acceleration sensor in accordance with the second embodiment.

FIG. 18 is a graph diagram showing the rotational angle dependence of the capacitance CL between the left movable electrode 31L and the top left electrode 21L and the capacitance CR between the right movable electrode 31R and the top right electrode 21R in the acceleration sensor in accordance with the second embodiment. The horizontal axis of FIG. 18 represents the variation ΔθL in rotational angle and the variation ΔθR in rotational angle, similarly to the horizontal axis of FIG. 11.

In the acceleration sensor 201 in accordance with the second embodiment, the distance LXLts is shorter than the distance LXRts, and the distance LXLte is shorter than the distance LXRte, as well as the distance between the distance LXLte and the distance LXLts is smaller than the distance between the distance LXRte and the distance LXRts. Therefore, in a position where ΔθL=ΔθR=0 is satisfied, or, in the rest position of the left movable electrode 31L and the right movable electrode 31R when the gravitational acceleration GR is applied in the vertical direction (negative z-axis direction), the first derivative CL' of the capacitance CL is equal to the first derivative CR' of the capacitance CR, and also the second derivative CL" of the capacitance CL is equal to the second derivative CR" of the capacitance CR. Accordingly, in a wide range of the variation ΔθL in rotational angle and the variation ΔθR in rotational angle, the capacitance CL become equal to the capacitance CR.

Further, a difference appearing between the second derivative CL" of the capacitance CL and the second derivative CR" of the capacitance CR may cause degradation in linearity of the output ΔC corresponding to a capacitance difference between the capacitance CL and the capacitance CR of the acceleration sensor, to the variations ΔθL and ΔθR.

Figure 19:
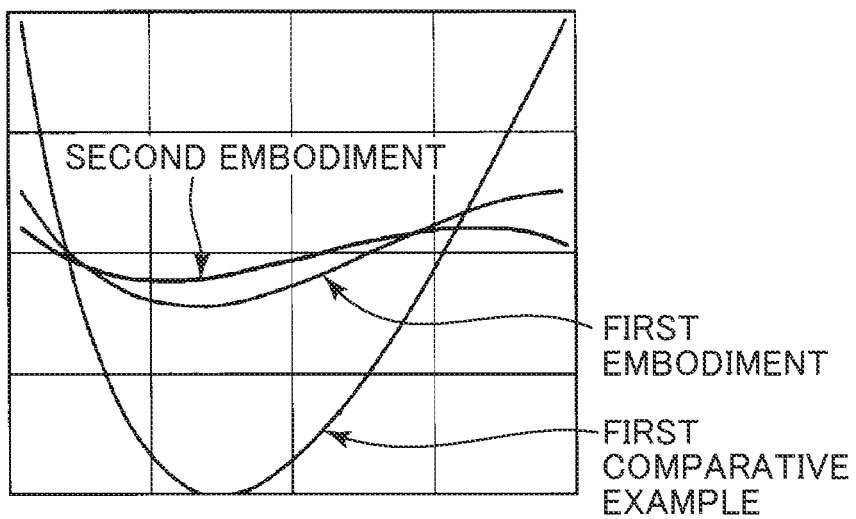
FIG. 19 is a graph diagram illustrating the nonlinearity of output when acceleration is applied to each of the acceleration sensors in accordance with the first embodiment, the second embodiment, and the first comparative example.

FIG. 19 is a graph diagram showing the nonlinearity of the output ΔC when acceleration is applied to each of the acceleration sensors in accordance with the first embodiment, the second embodiment and the first comparative example. The horizontal axis of FIG. 19 represents the applied acceleration. The vertical axis of the FIG. 19 represents the nonlinearity of the output ΔC.

As illustrated in FIG. 19, the nonlinearity of the output ΔC in the aforementioned acceleration sensor in accordance with the first embodiment is smaller than the nonlinearity of the output ΔC in the acceleration sensor in accordance with the first comparative example. Further, the nonlinearity of the output ΔC in the acceleration sensor in accordance with the second embodiment is smaller than the nonlinearity of the output ΔC in the aforementioned acceleration sensor in accordance with the first embodiment. From this fact, the effects of the acceleration sensors in accordance with the above-described first embodiment and the second embodiment are apparent.

<Essential Features and Effects of Acceleration Sensor According to First Embodiment>

As described above, in the acceleration sensor 201 according to the second embodiment, the distance LXLts is shorter than the distance LXRts, and the distance LXLte is shorter than the distance LXRte, as well as the difference between the distance LXLte and the distance LXLts is shorter than the difference between the distance LXRte and the distance LXRts.

As a result, in the rest position of the movable electrodes when the gravitational acceleration GR is applied, the first derivative CL' of the capacitance CL becomes equal to the first derivative CR' of the capacitance CR, and also the second derivative CL" of the capacitance CL becomes equal to the second derivative CR" of the capacitance CR.

Thus, according to the second embodiment, in addition to the advantageous effects according to the aforementioned first embodiment, outputting of the output ΔC with excellent linearity is enabled. This makes it possible to provide an acceleration sensor with high sensitivity, low power consumption and high linearity of output to applied acceleration.

Modification of the Second Embodiment

Possible methods of measuring acceleration in the vertical direction with high accuracy include a method involving servo control using Coulomb force generated by applying a voltage between a movable electrode and a stationary electrode to control a position of the movable electrode. An acceleration sensor using the servo control method to detect acceleration will now be described as a modification of the second embodiment.

Figure 20:
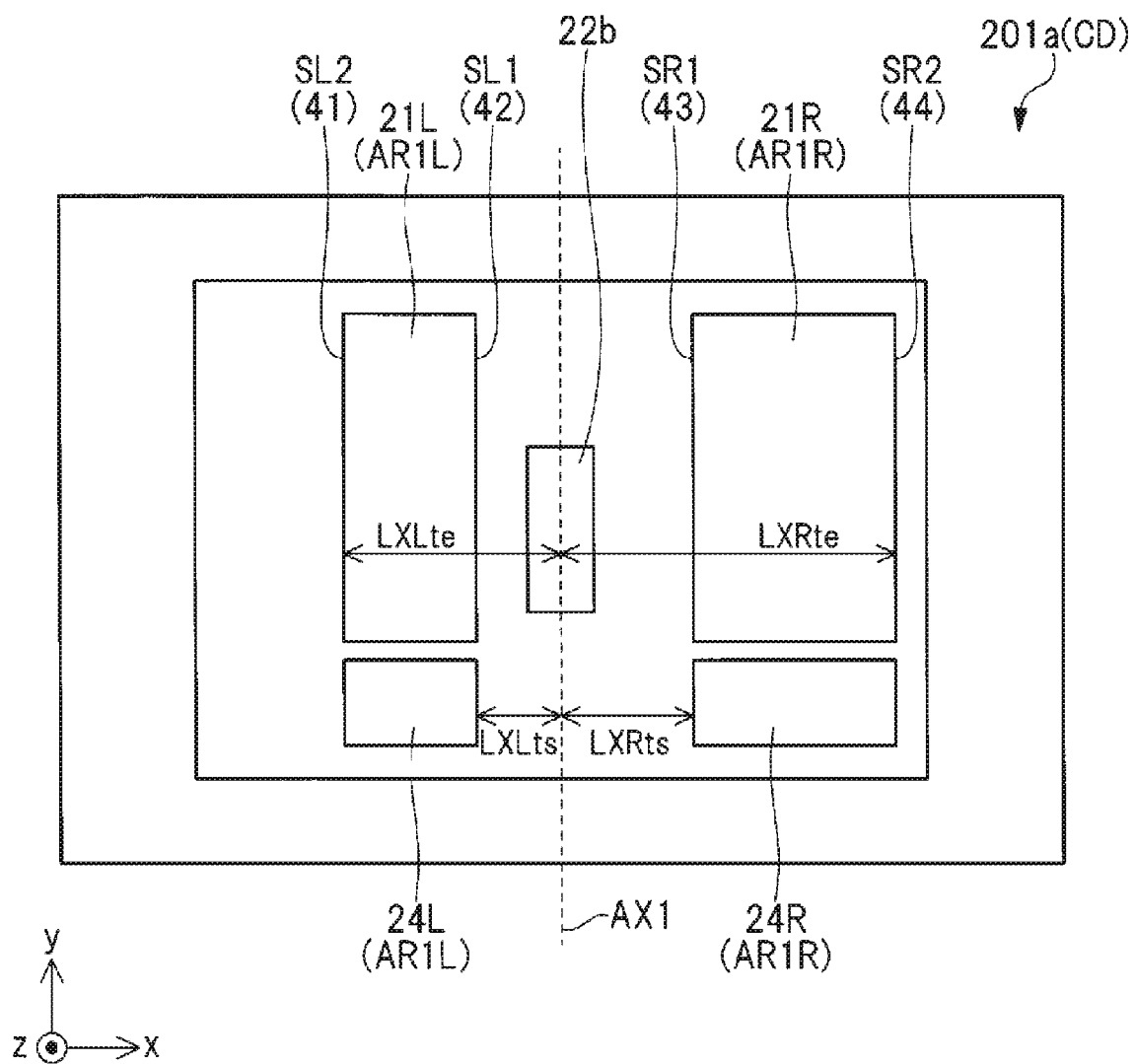
FIG. 20 is a plan view of an acceleration sensor in accordance with a modification of the second embodiment.

FIG. 20 is a plan view of an acceleration sensor in accordance with a modification of the second embodiment.

As illustrated in FIG. 20, in an acceleration sensor 201a in accordance with the modification of the second embodiment, the cap layer CD has a left servo control top electrode 24L and a right servo control top electrode 24R in addition to the top left electrode 21L and the top right electrode 21R.

The left servo control top electrode 24L is formed on the underside of the cap substrate 20, or, underneath the cap substrate 20, in the region AR1L other than the region in which the gap adjustment film 22b is formed, as in the case of the top left electrode 21L illustrated in FIG. 13. The left servo control top electrode 24L is placed, in plan view, on one side of the top left electrode 21L in the y-axis direction.

The right servo control top electrode 24R is formed on the underside of the cap substrate 20, or, underneath the cap substrate 20, in the region AR1R other than the region in which the gap adjustment film 22b is formed, as in the case of the top right electrode 21R illustrated in FIG. 13. The right servo control top electrode 24R is placed, in plan view, on one side of the top right electrode 21R in the y-axis direction.

It should be noted that the structure of the acceleration sensor 201a in accordance with the comparative example of the second embodiment may be achieved as a structure similar to the aforementioned acceleration sensor 1 in accordance with the first embodiment, in which the left servo control top electrode and the right servo control top electrode may be used respectively to double as the top left electrode 21L and the top right electrode 21R. Alternatively, the acceleration sensor 201a in accordance with the comparative example of the second embodiment may have a left servo control movable electrode and a right servo control movable electrode in addition to the left movable electrode 31L and the right movable electrode 31R.

Specifically, the left servo control top electrode and the top left electrode 21L may be separately or integrally provided, and/or, the right servo control top electrode and the top right electrode 21R may be separately or integrally provided. In either case, the same advantageous effects will be produced. Further, the left servo control movable electrode and the left movable electrode 31L may be separately or integrally provided, and/or, the right servo control movable electrode and the right movable electrode 31R may be separately or integrally provided. In either case, the same advantageous effects will be produced.

The Coulomb force used in the servo control is proportional to the first derivative CL' of the capacitance CL, and is proportional to the first derivative CR' of the capacitance CR. Therefore, if the variation $\Delta\theta L$ dependence of the first derivative CL' and the variation $\Delta\theta R$ dependence of the first derivative CR' are different from each other, this creates a need to control such that a servo voltage to be applied between the left servo control top electrode 24L and the top left electrode 21L, and a servo voltage to be applied between the right servo control top electrode 24R and the top right electrode 21R have different values from each other, resulting in complicated servo control.

Further, since the maximum servo voltage is required to be determined in accordance with smaller one of the first derivative CL' and the first derivative CR', the servo voltage may rise higher. Concomitantly with this, the micro-vibration acceleration applied in the vertical direction (negative z-axis direction) may be incapable of being detected with accuracy, or alternatively, the power consumption of the acceleration sensor may be increased.

On the other hand, similarly to the acceleration sensor 201 in accordance with the second embodiment, in the acceleration sensor 201a in accordance with the modification of the second embodiment, the distance LXLts is shorter than the distance LXRts, and the distance LXLte is shorter than the distance LXRte, as well as the distance between the distance LXLte and the distance LXLts is smaller than the distance between the distance LXRte and the distance LXRts.

Accordingly, the rotational angle dependence of the capacitance value of the capacitance CL between the left movable electrode 31L and the top left electrode 21L in the acceleration sensor 201a can be made analogous to the rotational angle dependence of the capacitance value of the capacitance CL between the left movable electrode 31L and the top left electrode 21L in the acceleration sensor 201 illustrated in FIG. 18.

The rotational angle dependence of the capacitance value of the capacitance CR between the right movable electrode 31R and the top right electrode 21R in the acceleration sensor 201a can also be made analogous to the rotational angle dependence of the capacitance value of the capacitance CR between the right movable electrode 31R and the top right electrode 21R in the acceleration sensor 201 in accordance with the second embodiment illustrated in FIG. 18.

Here, as in the case of the relationship of the modification with the second embodiment, acceleration sensors with the left servo control top electrode and the right servo control top electrode formed additionally in the first comparative example and the aforementioned first embodiment 1 are described respectively as a second comparative example and a third comparative example.

For the purpose of easier understanding, the left servo control top electrode and the right servo control top electrode in the second comparative example are set to be identical in area with the top left electrode and the top right electrode in the first comparative example, respectively. The left servo control top electrode and the right servo control top electrode in the third comparative example are also set to be identical in area with the top left electrode and the top right electrode in the aforementioned first embodiment, respectively.

An absolute value of the Coulomb force generated at the top left electrode 21L and the top right electrode 21R when the servo voltage is applied is expressed as a ratio of a capacitance value to a gap amount. Therefore, for example, if the servo voltage of 1V is applied, the absolute value of the Coulomb force in the second comparative example is 2.3 $\mu N$ at the top left electrode 21L and 0.8 $\mu N$ at the top right electrode 21R, and the absolute value of the Coulomb force in the third comparative example is 1.5 $\mu N$ at the top left electrode 21L and 1.2 $\mu N$ at the top right electrode 21R.

On the other hand, the absolute value of the Coulomb force in the second embodiment is 1.3 $\mu N$ at the top left electrode 21L and 1.3 $\mu N$ at the top right electrode 21R.

In this manner, in the modification of the second embodiment, when, for example, the servo voltage of 1V is applied, the Coulomb force generated at the top left electrode 21L is equal to the Coulomb force generated at the top right electrode 21R. Because of this, the servo control is prevented from being complicated and thus the servo voltage can be kept lower.

Thus, even in the modification of the second embodiment, it is possible to make the first derivative CL' of the capacitance CL equal to the first derivative CR' of the capacitance CR, and to make second derivative CL" of the capacitance CL equal to the second derivative CR" of the capacitance CR in the rest position of the left movable electrode 31L and the right movable electrode 31R when the gravitational acceleration GR is applied, as in the case of the second embodiment.

In this manner, the servo control is prevented from being complicated and a lower servo voltage can be achieved. As a result, the micro-vibration acceleration applied in the vertical direction (negative z-axis direction) is able to be detected with high accuracy, or alternatively, a reduction in power consumption of the acceleration sensor 201a is enabled.

Although the invention developed by the inventors has been described in detail based on the embodiments, the present invention is not limited to the embodiments, and it should be understood that various changes may be made without departing from the spirit or scope of the present invention.

LIST OF REFERENCE SIGNS

1 ... Acceleration sensor
10 ... Base substrate
12a, 12b ... Gap adjustment film
13L ... Left space
13R ... Right space
20 ... Cap substrate
21L ... Top left electrode
21R ... Top right electrode
22a, 22b ... Gap adjustment film
23L ... Left space
23R ... Right space
24L ... Left servo control top electrode
24R ... Right servo control top electrode
31L ... Left movable electrode
31R ... Right movable electrode
32a, 32b ... Torsion spring
33 ... Stationary portion
34 ... Frame
35L ... Left space
35R ... Right space
36a, 36b, 37a, 37b ... End
38a, 38b ... Coupling portion
41 to 48, 61 to 98 ... End
101, 201, 201a ... Acceleration sensor
AR1, AR1L, AR1R, AR2 ... Region
AX1 ... Rotation axis
BL ... Base layer
CD ... Cap layer
G1 ... Vibrator source
G2a, G2b, G2c, G2d, G2e ... Geophone
G3 ... Ground surface
G4a, G4b ... Layer boundary
GAPL, GAPR ... Gap length
GR ... Gravitational acceleration
LXLte, LXLts, LXLme, LXLms ... Distance
LXRte, LXRts, LXRme, LXRms ... Distance
LYLt, LYRt ... Length
LZt ... Distance
ML ... Membrane layer
SL1, SL2, SL3, SL4 ... Side surface
SR1, SR2, SR3, SR4 ... Side surface
SM1L, SM2L, SM3L, SM4L ... Side surface
SM1R, SM2R, SM3R, SM4R ... Side surface

The invention claimed is:

1. An acceleration sensor, comprising:
   a first substrate;
   a second substrate disposed away from the first substrate in a first direction; and
   a movable section disposed between the first substrate and the second substrate and rotating about a rotation axis along a second direction which is perpendicular to the first direction,
   wherein the movable section includes a first movable electrode and a second movable electrode which are placed on either side of the rotation axis in a third direction which is perpendicular to the first direction and the second direction,
   wherein a stationary portion is disposed at the rotation axis between first movable electrode and the second movable electrode,
   wherein the stationary portion is fixed to the second substrate via a first film connected to the second substrate and the stationary portion is fixed to the first substrate via a second film connected to the first substrate,
   wherein the second substrate includes a first detection electrode facing the first movable electrode, and a second detection electrode facing the second movable electrode, and
   wherein a first detection region in which capacitance is detected between the first movable electrode and the first detection electrode has a width in the third direction, and a second detection region in which capacitance is detected between the second movable electrode and the second detection electrode has a different width in the third direction than the width of the first detection region.

2. The acceleration sensor according to claim 1,
   wherein the first movable electrode undergoes displacement toward a first point when acceleration is applied, and
   the second movable electrode undergoes displacement toward a second point in a direction opposite to the first point when the acceleration is applied.

3. The acceleration sensor according to claim 1,
   wherein the first detection electrode has a length in the second direction, and the second detection electrode has a length in the second direction that is equal to the length of first detection electrode.

4. The acceleration sensor according to claim 1,
   wherein in plan view, a first distance from the rotation axis to a first end on the rotation axis side of the first detection electrode, and a second distance from the rotation axis to a second end on the rotation axis side of the second detection electrode are different from each other.

5. The acceleration sensor according to claim 1,
   wherein in plan view, a first distance from the rotation axis to a first end on the rotation axis side of the first detection electrode is shorter than a second distance from the rotation axis to a second end on the rotation axis side of the second detection electrode,
   in plan view, a third distance from the rotation axis to a third end on the opposite side of the first detection electrode from the rotation axis is shorter than a fourth distance from the rotation axis to a fourth end on the opposite side of the second detection electrode from the rotation axis, and
   a difference between the third distance and the first distance is smaller than a difference between the fourth distance and the second distance.

6. The acceleration sensor according to claim 1,
   wherein the first detection electrode includes a first electrode portion and a second electrode portion that are located away from each other in the second direction,
   the second detection electrode includes a third electrode portion and a fourth electrode portion that are located away from each other in the second direction,
   a first voltage is applied between the first electrode portion and the second electrode portion, and
   a second voltage is applied between the third electrode portion and the fourth electrode portion.

7. The acceleration sensor according to claim 6,
   wherein in plan view, a first distance from the rotation axis to a first end on the rotation axis side of the first detection electrode, and a second distance from the rotation axis to a second end on the rotation axis side of the second detection electrode are different from each other.

8. The acceleration sensor according to claim 1,
   wherein in plan view, a first distance from the rotation axis to a first end on the rotation axis side of the first detection electrode, and a second distance from the rotation axis to a second end on the rotation axis side of the second detection electrode are different from each other.

9. The acceleration sensor according to claim 1, wherein a first area of the first detection region in plan view and a second area of the second detection region in plan view are different from each other.

10. The acceleration sensor according to claim 1, wherein the first substrate, the second substrate, and the movable section are made of single crystalline silicon.

11. The acceleration sensor according to claim 1, wherein the stationary portion is disconnected with respect to the first movable electrode and the second movable electrode.

12. The acceleration sensor according to claim 1, wherein the first film and the second film extend along the first direction more than the third direction.

* * * * *